United States Patent [19]

Johnson

[11] Patent Number: 5,721,943
[45] Date of Patent: Feb. 24, 1998

[54] NEGOTIABLE LOCKS FOR CONCURRENT ACCESS OF CONTROL DATA BY MULTIPLE PROGRAMS

[75] Inventor: Verlyn Mark Johnson, Wykoff, Minn.

[73] Assignee: International Business Machines Corporation, Armonk, N.Y.

[21] Appl. No.: 137,313

[22] Filed: Oct. 14, 1993

[51] Int. Cl.$^6$ ................................................. G06F 15/00
[52] U.S. Cl. ........................ 395/800; 395/674; 395/608; 395/726
[58] Field of Search ...................... 395/275, 425, 395/650, 725, 800, 726, 628, 674

[56] References Cited

U.S. PATENT DOCUMENTS

| | | | |
|---|---|---|---|
| 4,558,413 | 12/1985 | Schmidt et al. | 395/619 |
| 4,709,326 | 11/1987 | Robinson | 395/726 |
| 4,805,106 | 2/1989 | Pfeifer | 395/726 |
| 4,809,170 | 2/1989 | Leblang et al. | 395/703 |
| 5,005,119 | 4/1991 | Rumbaugh et al. | 395/671 |
| 5,226,143 | 7/1993 | Baird et al. | 395/472 |
| 5,255,387 | 10/1993 | Arnold et al. | 395/617 |
| 5,287,521 | 2/1994 | Nitta et al. | 395/726 |
| 5,301,290 | 4/1994 | Tetzlaff et al. | 395/455 |
| 5,339,427 | 8/1994 | Elko et al. | 395/673 |
| 5,363,473 | 11/1994 | Srolfo et al. | 395/50 |

OTHER PUBLICATIONS

Article Entitled "A Mechanism for Concurrency Control In a Coupled Knowledge Base Management System" by Chen et al, Journal Of Information Processing, vol. 12, No. 4, 1989, pp. 343–350.

Article Entitled "Concurrency Control In Advanced Database Applications" By Barghouti et al, ACM Computing Surveys, vol. 23, No. 3, Sep. 1991, 269–317.

Article Entitled "CIM–OSA and Stochastic Time Petri Nets for Behavioural Modelling and Model Handling In CIM Systems Design and Building" by M. Aguiar et al, Proceedings of the Institute of Mechanical Engineers, Part B, vol. 207, No. B3, 1993 pp. 147–158.

*Primary Examiner*—Alyssa H. Bowler
*Assistant Examiner*—John Follansbee
*Attorney, Agent, or Firm*—Owen J. Gamon; Homer L. Knearl

[57] ABSTRACT

The control data locking protocol allows a concurrency control manager and data store to permit concurrent dynamic access between those creating or modifying control data and those using the data in their execution sessions. The invention applies to the use of production rules in inferencing sessions or to the use of ordered processing of flow rules by a workflow manager. The invention grants inference locks, read locks and write locks. Pre-lock notification with negotiation is implemented. Post-lock notification is also implemented. Those who are using the rules and those who are modifying them can specify whether changes should be incorporated immediately. In case two requested locks conflict, users resolve the conflict before both are granted. Controlled invocation of conversion processing converts session data as necessary to allow changes in control data to be made while the control data is being used in existing execution sessions.

14 Claims, 25 Drawing Sheets

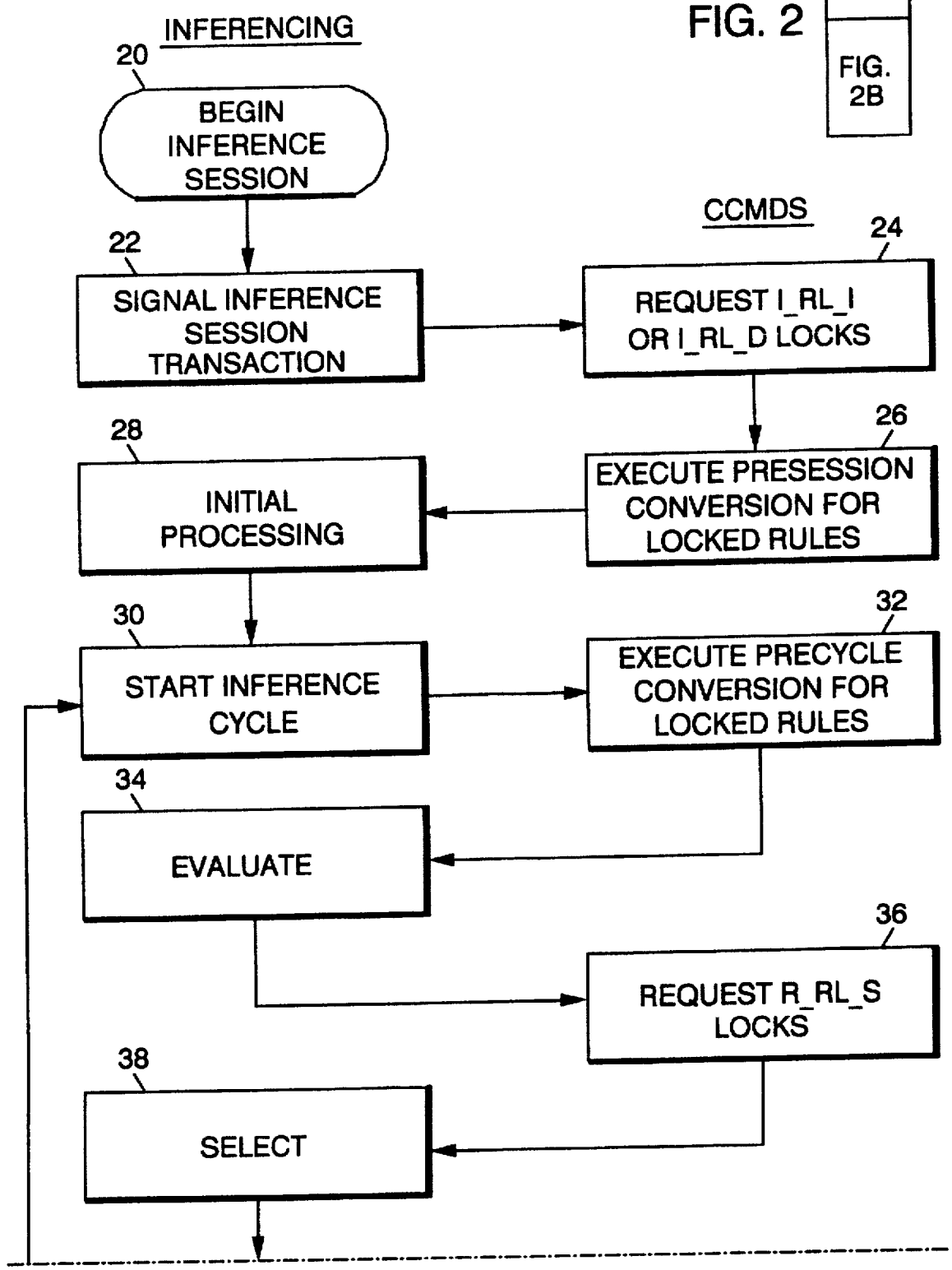

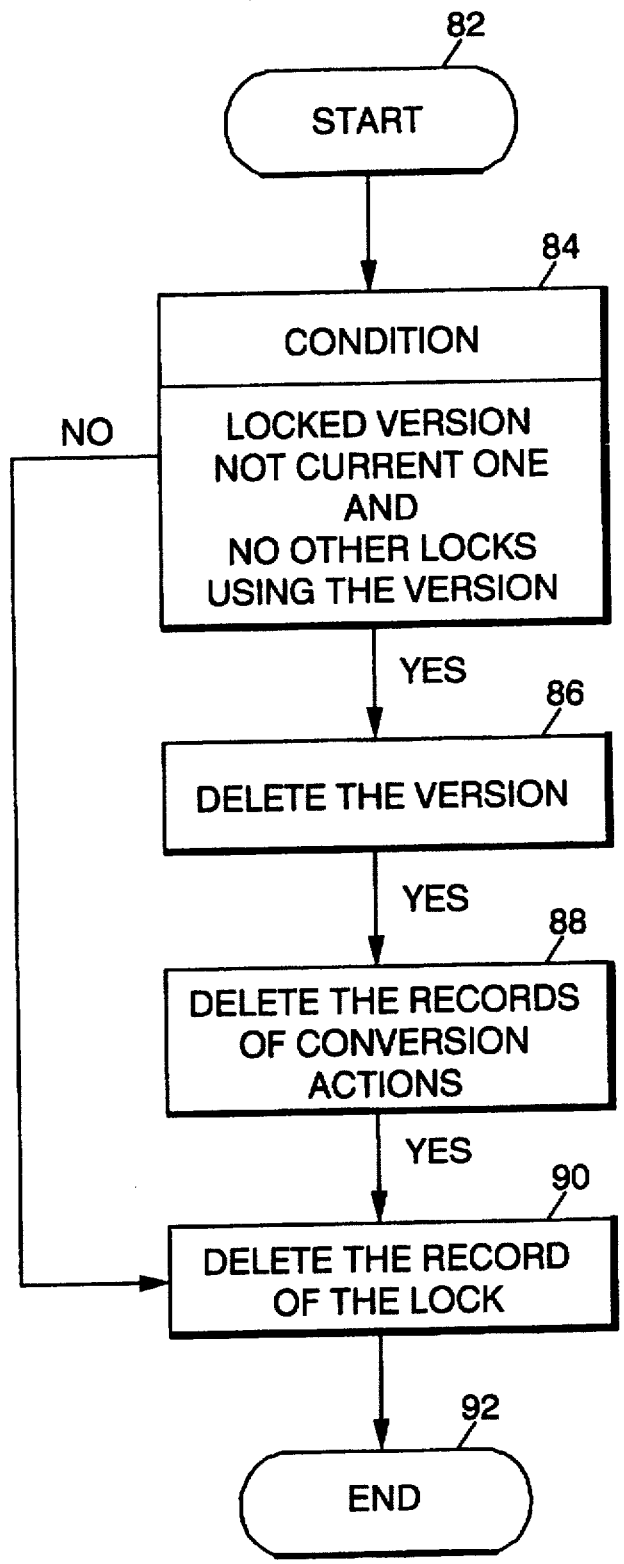

COMMIT UPDATES

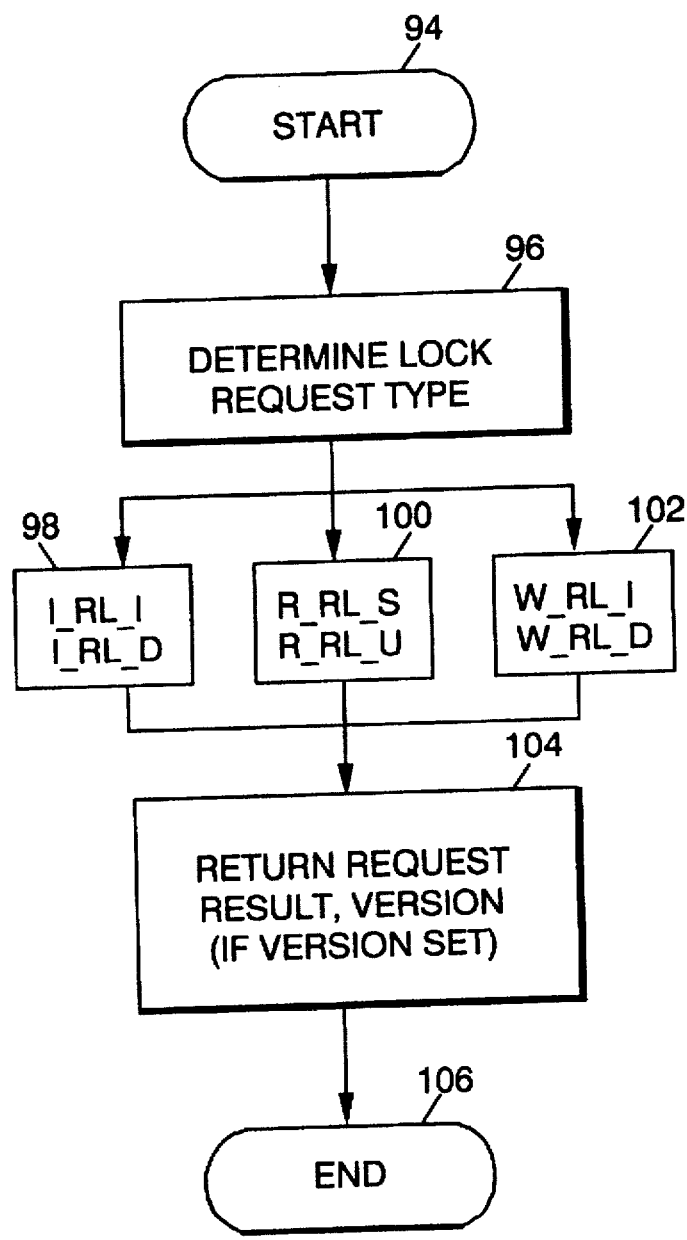

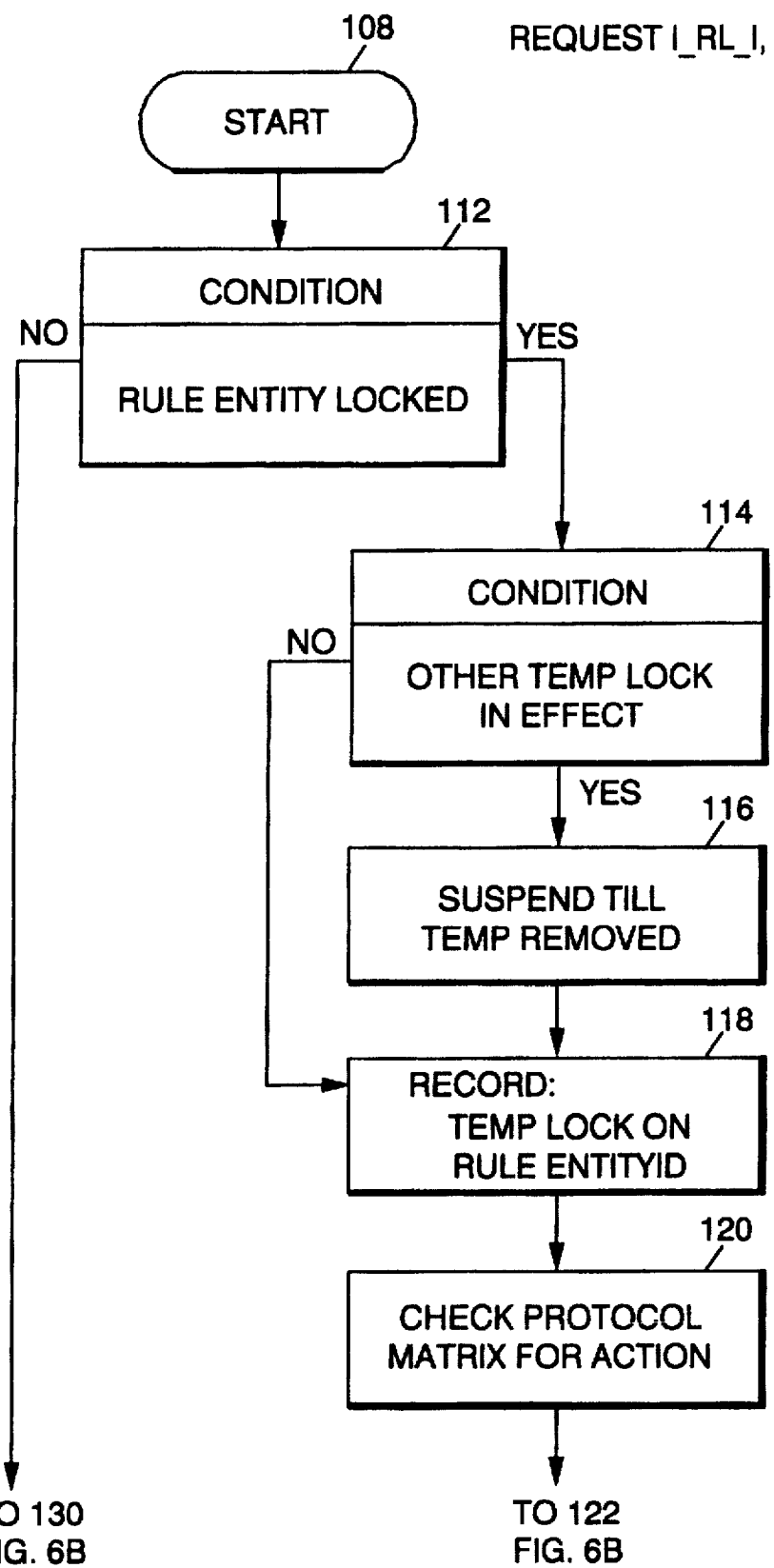

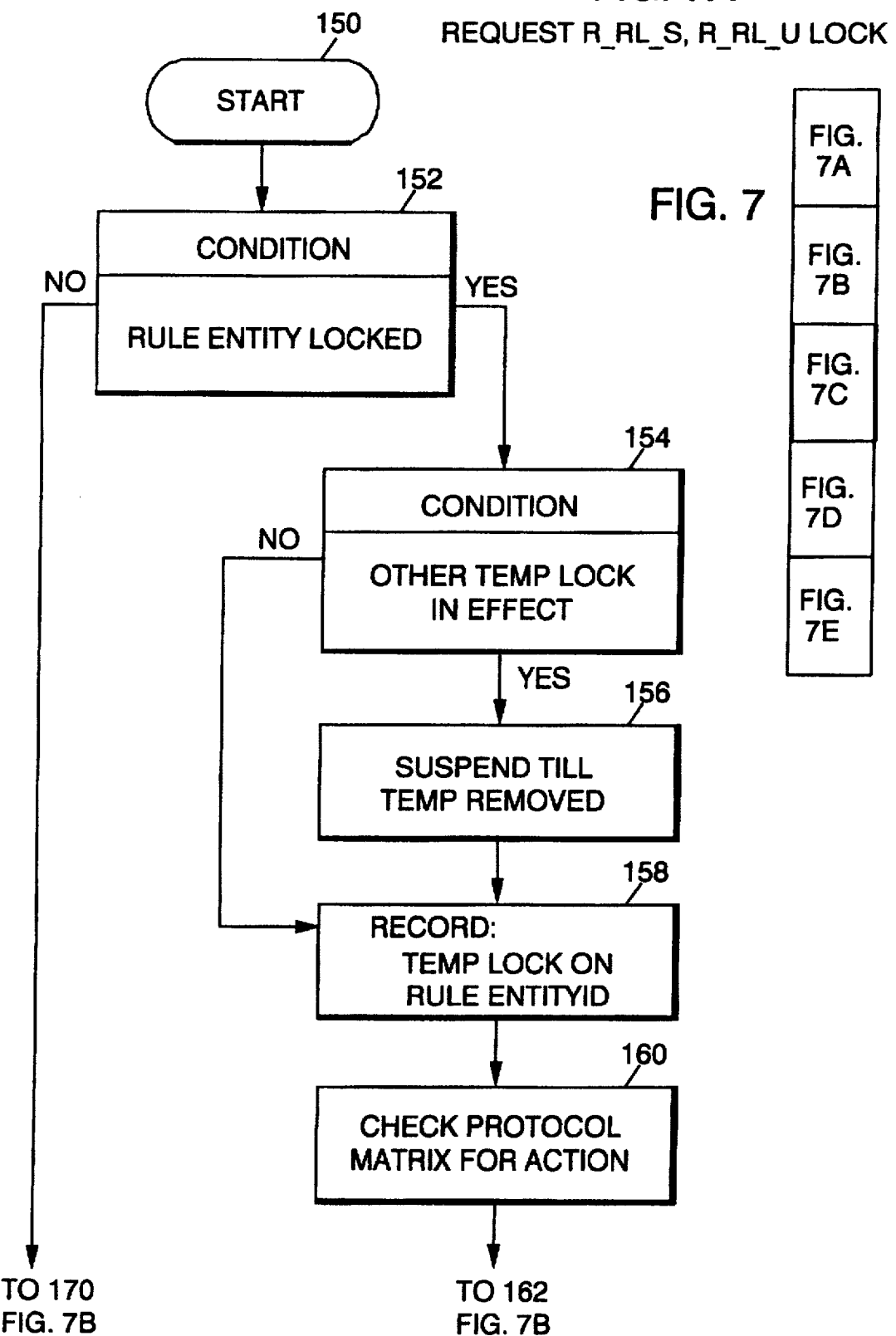

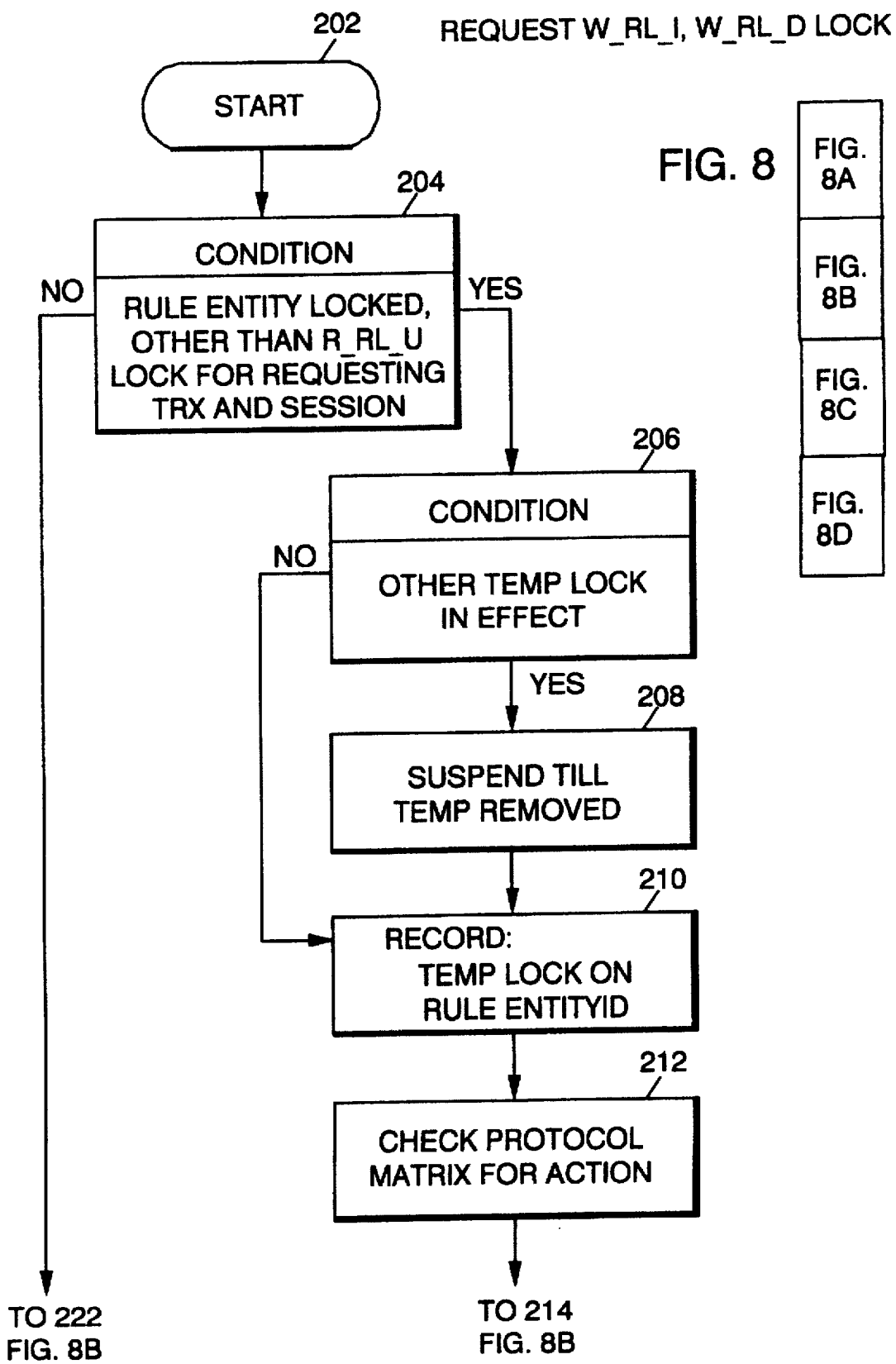

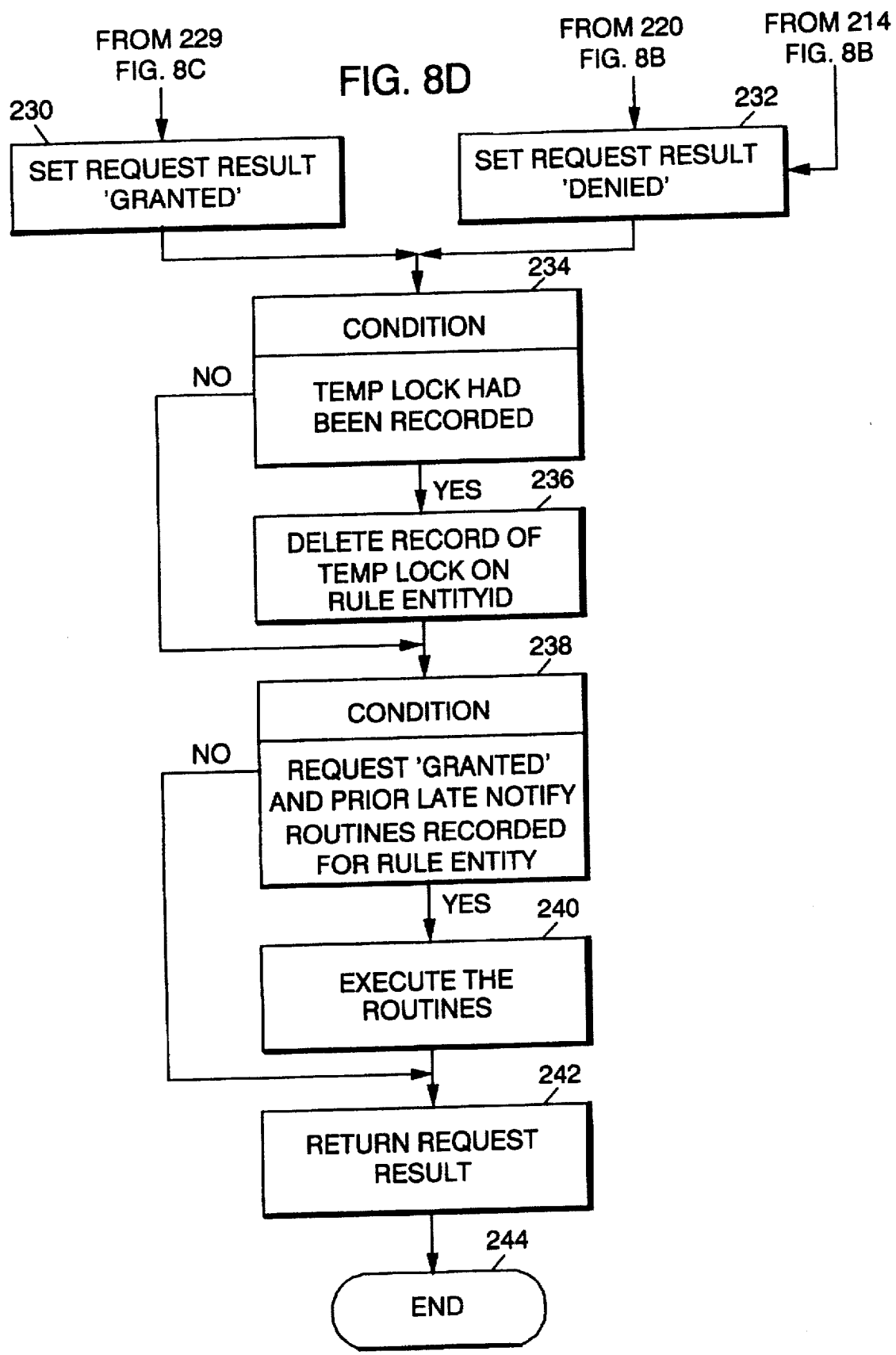

FIG. 9A

| INFERENCE LOCKING PROTOCOL MATRIX | | | | | | |
|---|---|---|---|---|---|---|
| HELD LOCK | REQUEST LOCK | | | | | |
| | I_RL_I | I_RL_D | R_RL_S | R_RL_U | W_RL_I | W_RL_D |
| SESSION HOLDING THE LOCK IS USING EITHER AN OLD OR THE CURRENT VERSION OF THE PRODUCTION RULE | | | | | | |
| I_RL_D | YES | YES | YES | NOTIFY | NOTIFY | NOTIFY |
| R_RL_S | YES | YES | YES | NOTIFY | NOTIFY | NOTIFY |
| R_RL_U | YES | YES | NOTIFY | NOTIFY | NOTIFY | NOTIFY |
| SESSION HOLDING LOCK IS USING THE CURRENT VERSION OF THE PRODUCTION RULE | | | | | | |
| I_RL_I | YES | YES | YES | NOTIFY | NOTIFY | NOTIFY |
| W_RL_I | YES | NOTIFY | NOTIFY | NOTIFY | NO | NO |
| W_RL_D | NOTIFY | YES | NOTIFY | NOTIFY | NO | NO |

FIG. 9B

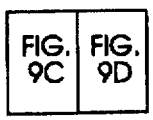

FIG. 9C

| INFERENCE LOCKING PROTOCOL MATRIX | | | | |
|---|---|---|---|---|
| HELD LOCK | REQUEST LOCK | | | |
| | I_RL_I | I_RL_D | R_RL_S | R_RL_U |
| SESSION HOLDING THE LOCK IS USING EITHER AN OLD OR THE CURRENT VERSION OF THE PRODUCTION RULE | | | | |
| I_RL_D | YES | YES | YES | NOTIFY |
| R_RL_S | YES | YES | YES | NOTIFY |
| R_RL_U | YES | YES | NOTIFY | NOTIFY |
| R_DT_S | YES | YES | YES | YES |
| R_DT_U | YES | YES | YES | YES |
| W_DT | YES | YES | YES | YES |
| SESSION HOLDING LOCK IS USING THE CURRENT VERSION OF THE PRODUCTION RULE | | | | |
| I_RL_I | YES | YES | YES | NOTIFY |
| W_RL_I | YES | NOTIFY | NOTIFY | NOTIFY |
| W_RL_D | NOTIFY | YES | NOTIFY | NOTIFY |

FIG. 9D

| INFERENCE LOCKING PROTOCOL MATRIX ||||||
|---|---|---|---|---|---|
| REQUEST LOCK ||||||
| | W_RL_I | W_RL_D | R_DT_S | R_DT_U | W_DT |
| SESSION HOLDING THE LOCK IS USING EITHER AN OLD OR THE CURRENT VERSION OF THE PRODUCTION RULE ||||||
| | NOTIFY | NOTIFY | YES | YES | YES |
| | NOTIFY | NOTIFY | YES | YES | YES |
| | NOTIFY | NOTIFY | YES | YES | YES |
| | YES | YES | YES | YES | NO |
| | YES | YES | YES | NO | NO |
| | YES | YES | NO | NO | NO |
| SESSION HOLDING LOCK IS USING THE CURRENT VERSION OF THE PRODUCTION RULE ||||||
| | NOTIFY | NOTIFY | YES | YES | YES |
| | NO | NO | YES | YES | YES |
| | NO | NO | YES | YES | YES |

FIG. 10

| I_RL_I | INFERENCE RULE (CONTROL DATA) LOCK REQUESTING IMMEDIATE UPDATE OF CHANGES |
|---|---|
| I_RL_D | INFERENCE RULE (CONTROL DATA) LOCK REQUESTING DELAY OF CHANGES |
| R_RL_S | READ RULE (CONTROL DATA) LOCK WITH SHARED ACCESS |
| R_RL_U | READ RULE (CONTROL DATA) LOCK WITH INTENT TO UPDATE THE RULE |
| W_RL_I | WRITE RULE (CONTROL DATA) LOCK REQUESTING IMMEDIATE EFFECT OF CHANGES |
| W_RL_D | WRITE RULE (CONTROL DATA) LOCK REQUESTING DELAY OF CHANGES |
| R_DT_S | READ NONCONTROL DATA LOCK WITH SHARED ACCESS |
| R_DT_U | READ NONCONTROL DATA LOCK WITH INTENT TO UPDATE THE NONCONTROL DATA |
| W_DT | WRITE NONCONTROL DATA LOCK |

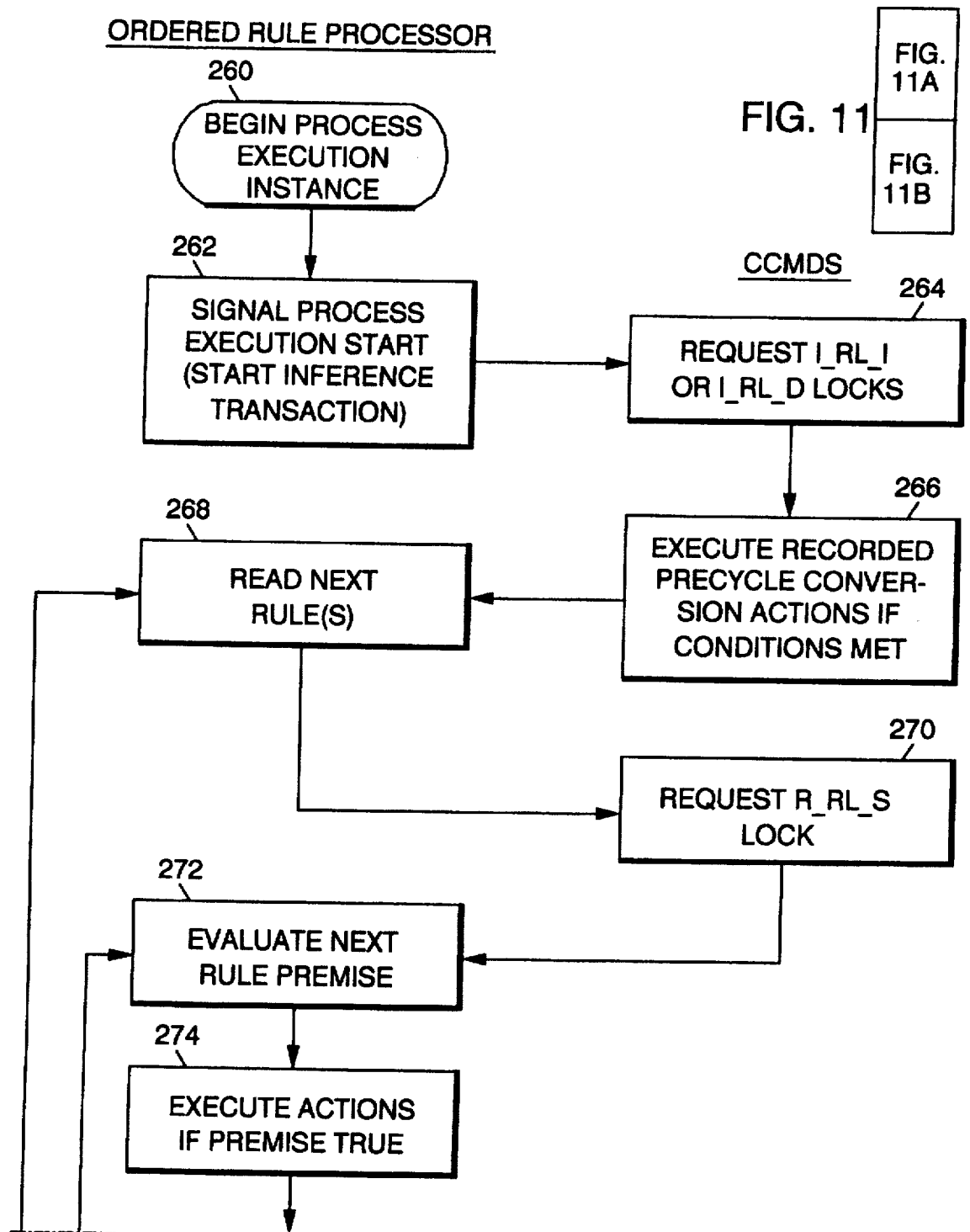

NEGOTIABLE LOCKS FOR CONCURRENT ACCESS OF CONTROL DATA BY MULTIPLE PROGRAMS

BACKGROUND OF THE INVENTION

1. Field of the Invention

This invention relates to apparatus and methods for supporting concurrent dynamic access to control data. The present invention is particularly useful in expert systems for supporting concurrent dynamic access between those program users creating or modifying production rules, and those users executing them in inferencing sessions. The invention is also useful in the context of ordered rule processing systems, such as workflow managers. Again, there needs to be dynamic, concurrent access by those users changing the rules and those users using them to control their execution flow.

2. Description of the Prior Art

Concurrent access is becoming increasingly important as expert system applications are used in changing manufacturing environments and machine learning applications. Prior systems for controlling access to control data have not permitted concurrent access. For example, prior systems have not permitted a user to modify a production rule and have the change be reflected in currently executing inferencing sessions.

Production rules are one form of representing knowledge for use by an expert system shell. Each production rule has an IF part and a THEN part. The IF part consists of a set of conditions which must be satisfied for the rule to be eligible to fire. The THEN part of a production rule consists of a series of actions to take if the rule is fired. To fire a rule means to execute it by performing the actions found in the THEN part.

Inferencing is the logical chaining affect that occurs when production rules are fired; i.e., executed. In forward chaining, the shell identifies a rule whose IF part is true and fires the actions in the THEN part. These executed actions may cause the IF parts of other rules to become true, and those rules are selected and fired. Backward chaining starts with a goal, and finds rules whose THEN part makes the goal true. One of these rules is selected and the conditions of its IF part become the goals to be met. For example, if the original goal was A=1, the system might select a rule which says IF B=2 and C=3, THEN A=1. The new goals to be met are B=2 and C=3. In an inferencing session, forward and backward chaining continues until the problem is solved or no further progress can be made.

Prior art database management systems include U.S. Pat. No. 5,065,400. This patent describes a method for utilizing a table to track whether programs which contained errors have been corrected. It tracks logically-related programs to ensure they have been properly corrected prior to recompiling. This patent assumes that only the most current version of a program will be used, and does not allow controlled use of old rules through notification and response, multiple versions and conversion actions.

U.S. Pat. No. 5,005,119 describes a method for permitting users to control the execution of a series of programs and what data is inputted into, and created by, that execution. It allows controlled testing of different versions of programs. However, it does not allow controlled cooperation between those program users who are changing rules and those users executing them, nor can it specify that changes take effect immediately or be delayed.

U.S. Pat. No. 4,805,106 describes a method to coordinate replicated computer memories across a network. Serial access is enforced, and any updates are done to all copies. Multiple copies are not allowed.

U.S. Pat. No. 4,809,170 describes a method for tracking updates to computer software as it is developed. A current version is established, and a delta file of updates is kept. Notification is used to inform different users that they may be changing the same program, but it does not delay updates until possible conflicts are resolved.

U.S. Pat. No. 4,709,326 describes a method of implementing a locking device in either hardware or software. The protocol matrix is mapped to a bit transition table. Bits also record what devices must be notified of lock changes. This patent does not include notify and respond processing, and users cannot control whether a lock is granted. It does not address cooperation between updating and executing sessions.

U.S. Pat. No. 4,558,413 describes a system to track the development of computer programs and bring versions together for compiles. Notification is used to inform the controller that a program has been changed. This patent is directed at controlling a build, not managing execution and modification concurrently.

Two published papers also attempt to address the problem of concurrent access to control data in an inferencing environment. "Concurrency Control in Advanced Database Applications", by N. Barghouti, Published in *ACM Computing Surveys*, Volume 23, No. 3, September, 1991, illustrates the use of multiple versions and early and late notification for maintaining control data. It does not include negotiation of whether or not locks should be allowed, or requirements between those changing and executing the control data. "A Mechanism for Concurrency Control in a Coupled Knowledge Base Management System" by Y. Chen et al discusses the need for locking working memory data, but uses serial protocol to control access rather than allowing multiple versions and using conversion processing.

Regarding ordered rule processing, current projects allow definition of processes using various syntaxes, such as procedural rules or flow networks. These systems track states of execution instances. However, changes to the process definitions affect only new execution instances. Changes to individual instances require the instance execute from a copy of process flow. Again, concurrent, dynamic access by those updating and those executing the same control data is not supported. One related paper is "CIM-OSA and Stochastic Time Petri Nets for Behavioral Modelling and Model Handling in CIM Systems Design and Building" by M. Aguilar et al and published in *Proceedings of the Institute of Mechanical Engineers*, Part B (Journal of Engineering Manufacture), Volume 207, Number B3, 1993. This paper reviews a type of ordered rule processing, but assumes a serial process for moving the rules to an execution environment.

A need remains in the art for a method of managing execution and modification concurrently.

SUMMARY OF THE INVENTION

It is an object of this invention to support concurrent access to execute, or modify, control data by granting or denying locks on the data requested by various programs.

In accordance with the present invention, the first program to request a lock of any type on a section of control data is granted the lock. A section of control data might be a rule, or set of rules, in an expert system inferencing session or ordered rule processing session. One example of ordered rule processing session is a process execution controlled by a workflow manager. When another program requests a lock on the same section of control data, the second lock is granted if the two locks do not conflict and denied if the two locks conflict. As a feature of the present invention, both programs are notified of the situation if the two locks do conflict but, under the circumstances, it is likely that one or the other of the two users would be willing to change the lock held or requested so that the request could be accommodated. The users are permitted to negotiate the two locks. The negotiation is successful and the second lock is granted if the lock holder gives up the lock or changes it to a type which does not conflict, or the requester changes the type of lock requested to a type which does not conflict.

Three types of locks are provided: Executing (termed an "inferencing lock" in the figures and detailed description), reading, and writing. For the purpose of determining conflicts between lock requests, each type of lock is categorized into one of two categories in a total set of four categories: Immediate, delayed, shared and updating. Executing and writing locks may be categorized as immediate or delayed. Reading locks may be categorized as shared or updating.

The locks conflict if the lock is a writing lock and the request is for a writing lock. The request from the second program does not conflict if the lock is an executing lock and the request is an executing lock, the lock is an executing lock and the request is for a reading shared lock, the lock is a reading shared lock and the request is for an executing lock or a reading shared lock, the lock is a reading update lock and the request is for an executing lock, the lock is a writing immediate lock and the request is for an executing immediate lock, or the lock is a writing delayed lock and the request is for an executing delayed lock. The request from the second program is negotiable if the lock is an executing lock and the request is for a reading update lock or a writing lock, the lock is a reading shared lock and the request is for a reading update lock or a writing lock, the lock is a reading update lock and the request is for a reading lock or a writing lock, the lock is a writing immediate lock and the request is for an executing delayed lock or a reading lock, or the lock is for a writing delayed lock and the request is for an executing immediate lock or a reading lock.

As another feature of the invention, a lock holder program may request late notify, which informs the program when another lock has been granted on that section of control data. A lock holder or requestor program may alternatively request early notification, before a lock is granted, when possible conflicts exist with other lock holders.

In one embodiment of the invention, an inferencing program may hold an executing lock on a section of control data which is a rule which may be fired or expanded. In another embodiment of the invention, an executing lock may be held by a sequential rule processing program which executes a series of rules which comprise the sections of control data. As a feature of the present invention, conversion processing makes necessary adjustments to control and non-control data to allow immediate use of a modified rule by an inferencing or sequential rule processing session.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIGS. 2A, 2B is a flowchart showing the interaction between execution of the inference engine and the Concurrency Control Manager and Data Store.

FIGS. 4A and 4B show flowcharts of the process and operation of freeing a lock and the process and operation of committing an update, respectively.

FIG. 5 is a flowchart showing the process and operation of requesting a rule lock.

FIGS. 6A, 6B, 6C is a flowchart showing the process and operation of requesting an inference lock.

FIGS. 7A-7E is a flowchart showing the process and operation of requesting a rule read lock.

FIGS. 8A-8D is a flowchart showing the process and operation of requesting a rule write lock.

FIGS. 9A-9D show locking protocol matrices for rules (FIG. 9A) and for rules and data (FIG. 9B).

FIG. 10 is a table of terms.

FIGS. 11A, 11B is a block diagram showing the communication between the Concurrency Control Manager and Data Store (CCMDS) and an ordered rule processor, such as a workflow manager.

DETAILED DESCRIPTION OF THE PREFERRED EMBODIMENTS

Figure 1:
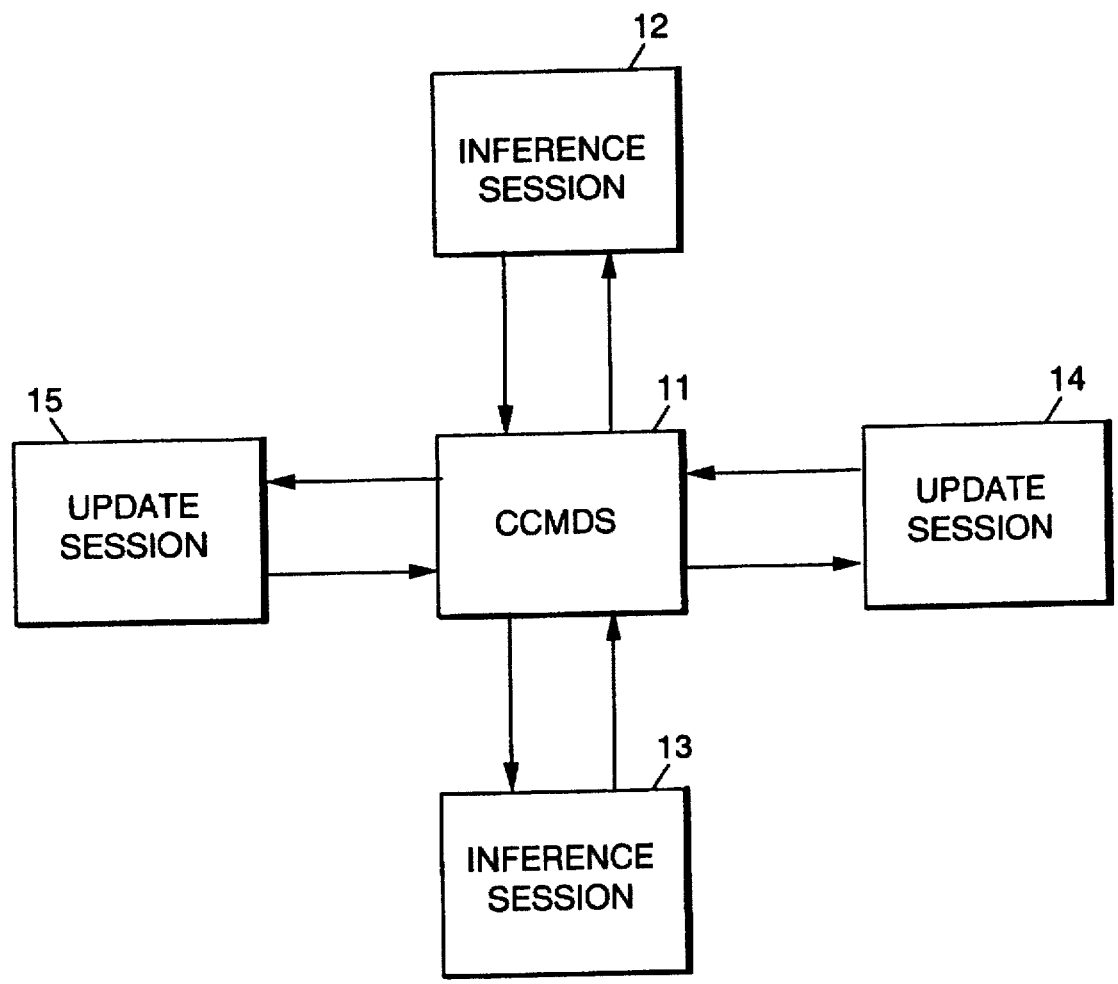
FIG. 1 is a block diagram showing the communication between the Concurrency Control Manager and Data Store (CCMDS) and inferencing and updating sessions.

FIG. 1 is a block diagram showing the interaction between the Concurrency Control Manager and Data Store (CCMDS) 11, inferencing sessions 12 and 13, and updating sessions 14 and 15. As an overview, when a user starts an inferencing session 12, the session signals to the CCMDS 11 first that inferencing will take place, second which rules will be used by the session, and third whether the session wishes any changes made by others to those rules to be incorporated immediately in the inference session. This represents the start of an inference transaction, meaning the control data is currently being processed as an instance of an execution for this session. The CCMDS determines whether any conflicts exist in accordance with the inferencing locking protocol matrix in FIG. 9A as described later herein.

When conflicts exist between a inferencing session that has a lock and one or more sessions requesting a lock, the CCMDS arranges for the sessions to immediately negotiate and resolve the conflicts, if possible. If the necessary inferencing locks can be granted to a requesting session, inferencing proceeds as shown and described in detail in FIG. 2. Whenever inferencing session 12 needs to use a specific rule, the CCMDS attempts to get a shared read lock on the rule, as discussed in reference to FIG. 9. A read lock is requested because the inferencing session will be using the rule and wants to know whether anyone intends to modify it. A shared read lock is requested because the session has no intent to update, or modify, the rule. Therefore, anyone else is free to use it. The CCMDS initiates necessary conversion processing of control and non-control data as inferencing proceeds. When inferencing completes, all inferencing locks are released. This represents the end of the inference transaction, established when the execution instance was started.

Figure 3:
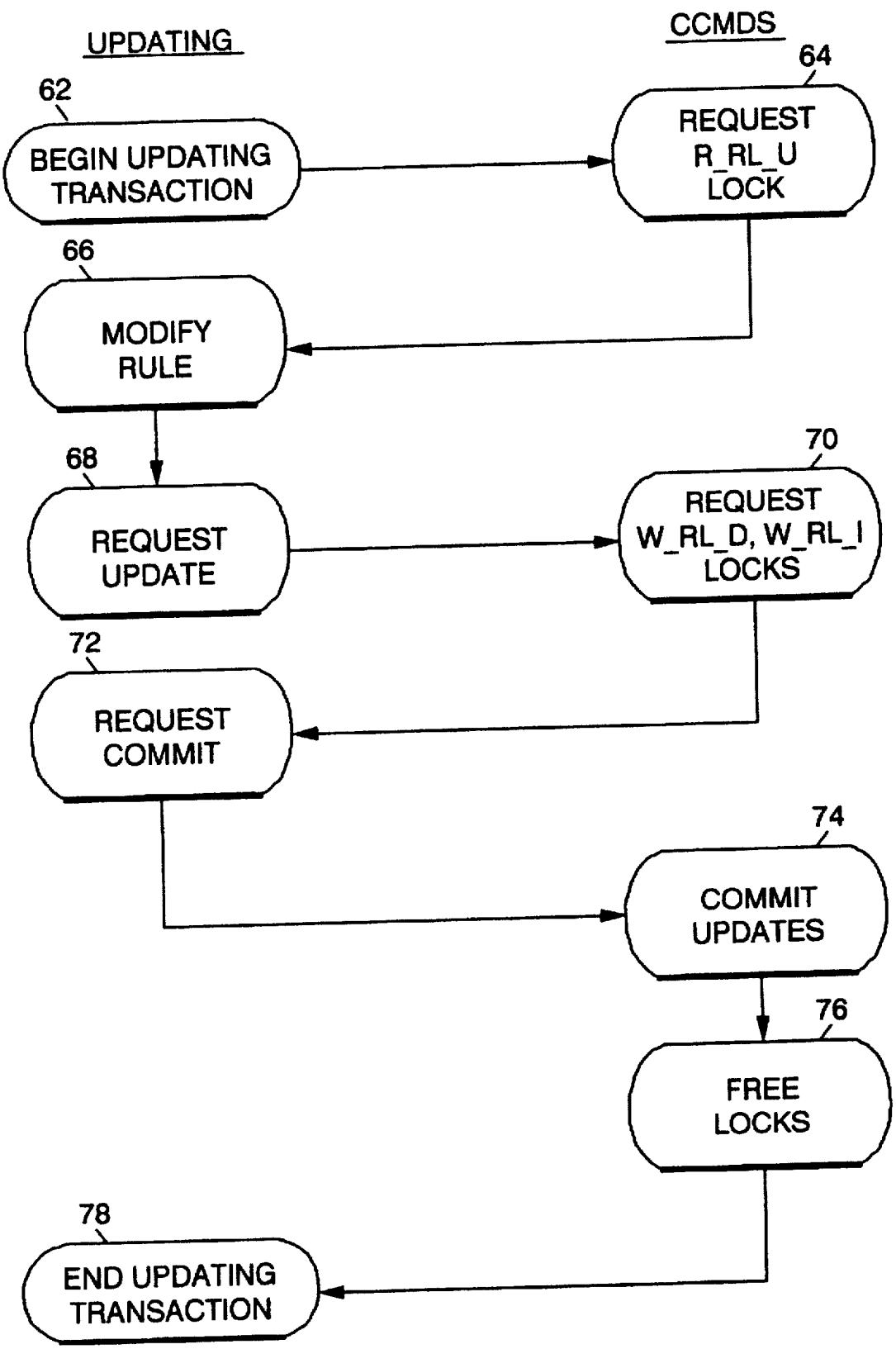
FIG. 3 is a flowchart showing the interaction between modification or update request and the Concurrency Control Manager and Data Store.

Similarly, when a user starts an updating session 14, the session signals the CCMDS. CCMDS 11 attempts to get a read update lock on the rule to be modified, while managing conflicts per the locking protocol matrix in FIG. 9A. When the modification is complete, the update session requests the update to be immediately visible to existing inference sessions, or delayed until existing inferencing sessions complete. The CCMDS attempts to get the requested lock, makes the update, initiates conversion processing of control and non-control data necessitated by the changes, and frees the lock since it is now finished. FIG. 3 shows this process in more detail, and is described hereinafter.

Figure 2B:
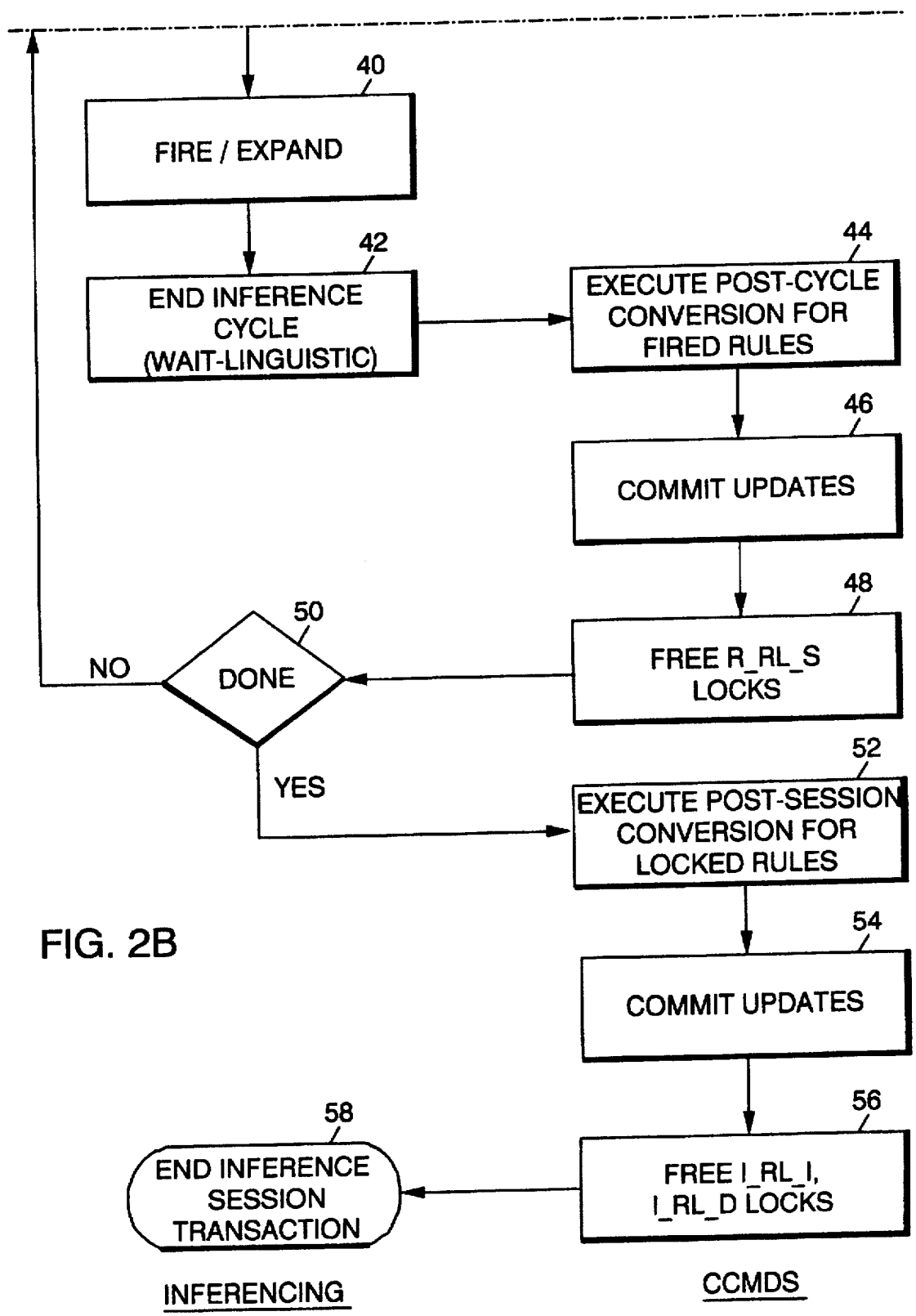

FIG. 2 shows in more detail the interaction between the inferencing process 14 and the database management control system (CCMDS) 11 in the preferred embodiment of the present invention. The inferencing process begins at operation 20, and step 22 signals an inference session to the CCMDS 11. The CCMDS, in operation 24, requests any necessary inference rule locks, which notify other sessions: First, that the rule is being used by the inferencing session, and second, whether updates should take effect immediately.

I_RL_I ("inference rule immediate") indicates that the inferencing session requests immediate updating of rules. In other words, updates of rules by others are to be incorporated immediately during the active inferencing session. I_RL_D ("inference rule delayed") indicates that updates are to be delayed until a new inferencing session starts.

The CCMDS at step 26 executes any presession conversion required for the locked rules. Conversion processing is the activity that needs to be taken to allow continued inferencing when a rule is changed while it is being used in an inferencing session. For example, the old version of a rule may have had an IF part checking for a value of "9", whereas the new version checks for a value of "10". The conversion processing would, among other things, check to see whether the value of "9" was present in working memory data and, if so, change it to a "10". Conversion processing generally modifies non-control data. For example, it might be necessary to modify the working storage or input/output files of the inferencing session by changing the file format, file address, or data values in fields of the file. Control data could also be modified by conversion if, for example, one rule defined another rule.

Figure 8B:
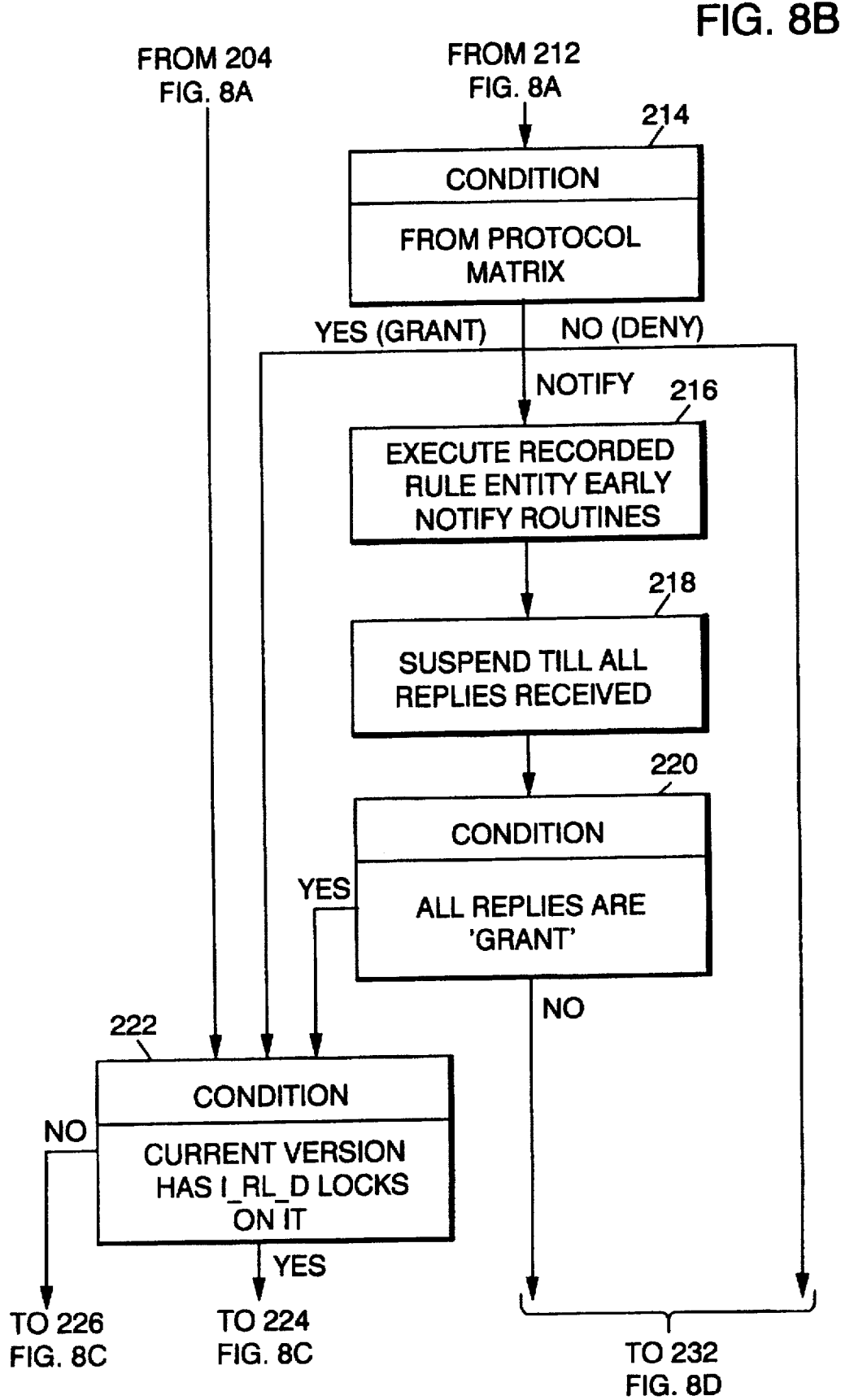
Figure 8C:
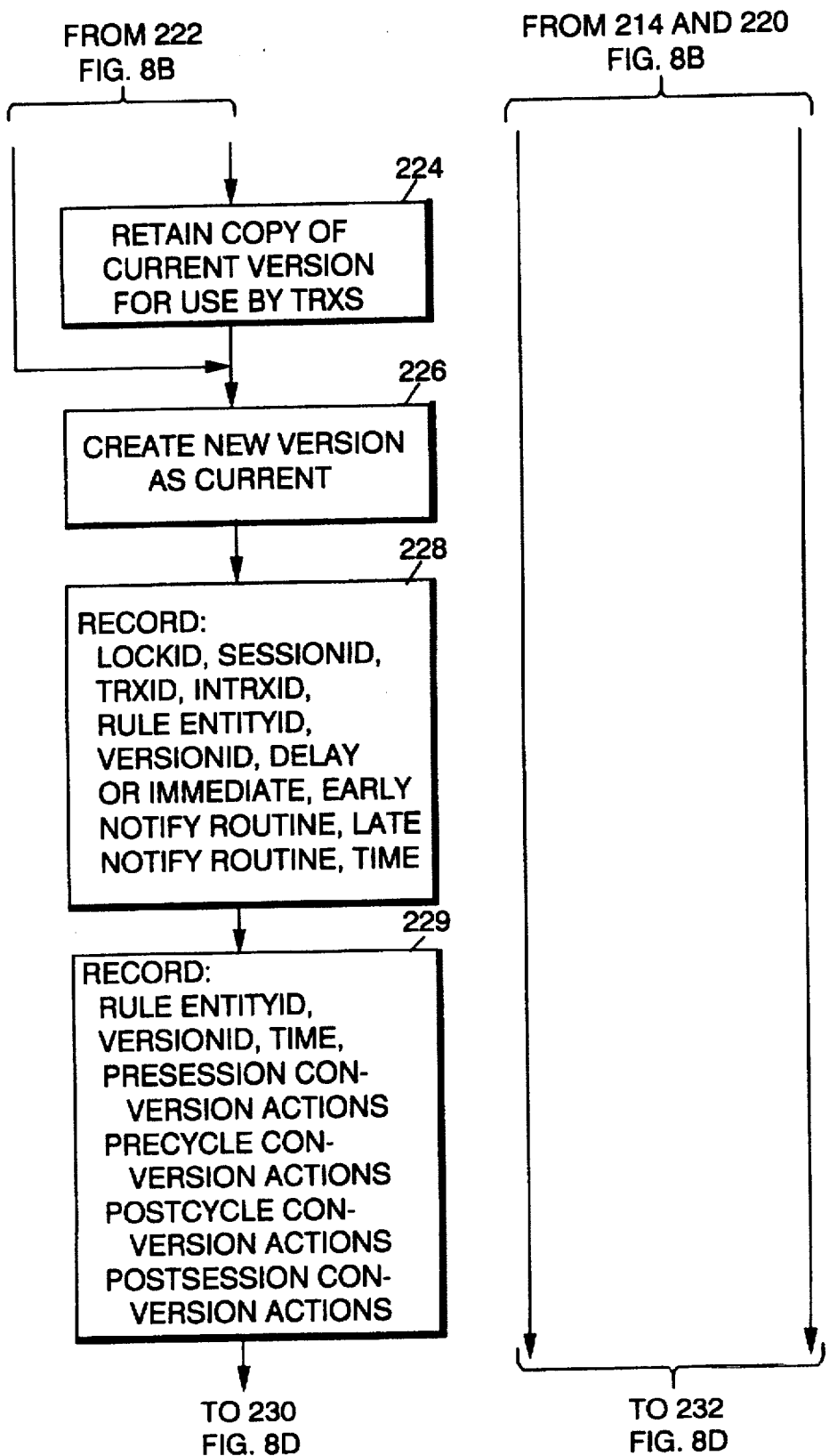

The CCMDS initiates conversion actions specified by a user who has modified a rule, as shown in detail in FIG. 8 described hereinafter. Step 229 of FIG. 8 shows the recording of conversion actions necessary after the rule is written. This record is not deleted until the rule is released by the inferencing session, as shown in FIG. 4, steps 86 and 88. Then the record is no longer necessary because any new inferencing session will start with compatible working storage, input/output files, rule sets, etc.

Presession conversion is initiated, or executed, as shown in step 26. Presession conversion is only necessary when a rule has changed after inferencing has begun, but before inference cycling has begun. Conversion is done for all rules holding I_RL_I or I_RL_D locks for this session.

The inferencing session does any initial processing at step 28, and starts the inference cycle operation 30. At the beginning of the inference cycle, precycle conversion operation 32 executes conversion of data, as necessary, for any rules that have changed since the last cycle begun. Thus, new rules can be incorporated by the inferencing session as often as each inferencing cycle. The inferencing session does not know which rules it will use, so conversion is done for all rules that might be used. Thereafter, inferencing operation 34 evaluates rule premises which causes the CCMDS in step 36 to request R_RL_S locks for rules whose premises are "TRUE" so they will be available for use by the inferencing session. R_RL_S is a "read rule shared" lock indicating that a rule is being read, but there is no intent to update it, so other sessions may also get a R_RL_S lock on that rule. The rules, whose premises are "TRUE", form the set selected for the next fire/expand cycle, as described above. Inferencing selects a rule from this set in operation 38, fires, or expands it, in step 40, and ends the cycle in step 42. In operation 44, the CCMDS executes any necessary postcycle conversion for the rules which were fired. Post-cycle conversion might be necessary if, for example, a fired rule had set a value that is now inconsistent with the new version of a modified rule.

In step 46, the CCMDS commits updates that have been made by firing, expanding, or conversion. This means the CCMDS recognizes the updates as permanent, and they become part of the current "version" of data. Committing rule updates may require updating recorded I_RL_I and I_RL_D version IDs. In step 48, the CCMDS frees the R_RL_S locks since the inferencing session is finished using those rules.

Next, in operation 50, inferencing checks to see whether inferencing is complete. If it is not, step 30 returns to start an inference cycle. If inferencing is complete, the CCMDS executes postsession conversion for all locked rules in step 52. Postsession conversion might be necessary, for example, if the session was using the old version of a rule or an output file in an old format. At the end of inferencing, the session would update the format of the file so new inferencing sessions, using the new rule, can use the file as well. The CCMDS then commits updates in step 54, and frees the I_RL_I and I_RL_D locks in step 56. Operation 58 ends the inferencing session.

FIG. 3 shows, in more detail, the interaction between the updating process and the Concurrency Control Manager and Data Store (CCMDS) in the preferred embodiment of the present invention. Updating begins in step 62, and CCMDS 11 requests the R_RL_U lock in step 64 in response to the begin updating command from updating. This is a "read rule update" lock indicating that the rule being read will be modified. Updating operation 66 modifies the rule, and step 68 requests a rule update, meaning conversion action as needed, notification, if previously requested, and commit by the CCMDS. The request includes an updating ID for any notification routines, and a delayed or immediate effect indication. In operation 70, the CCMDS requests W_RL_I and W_RL_D locks as needed and does notification and conversion. A W_RL_I ("write rule immediate) lock indicates that the rule has been updated and should be used immediately. A W_RL_D ("write rule delayed") lock indicates that only future inferencing sessions should use the new rule. Updating session then requests commit, in step 72, and the CCMDS commits the updates in operation 74, and frees the locks in step 76. Operation 78 ends the update.

FIG. 4A shows the process and operation of freeing a lock. Operation 82 starts the process, and operation 84 checks whether the version of the rule that was locked is either the current version or a version that some other session is using. If so, the record of the lock is deleted in step 90, but the rule is not deleted and the conversion record is not deleted because anyone still using the old rule would need the record to do necessary conversion to successfully update the rule. If neither of those conditions is true, no one needs the old rule or the conversion record, and the old version is deleted in step 86, the record of the conversion actions is deleted in step 88, and the record of the lock is deleted in step 90. Operation 92 ends the process.

Figure 4B:
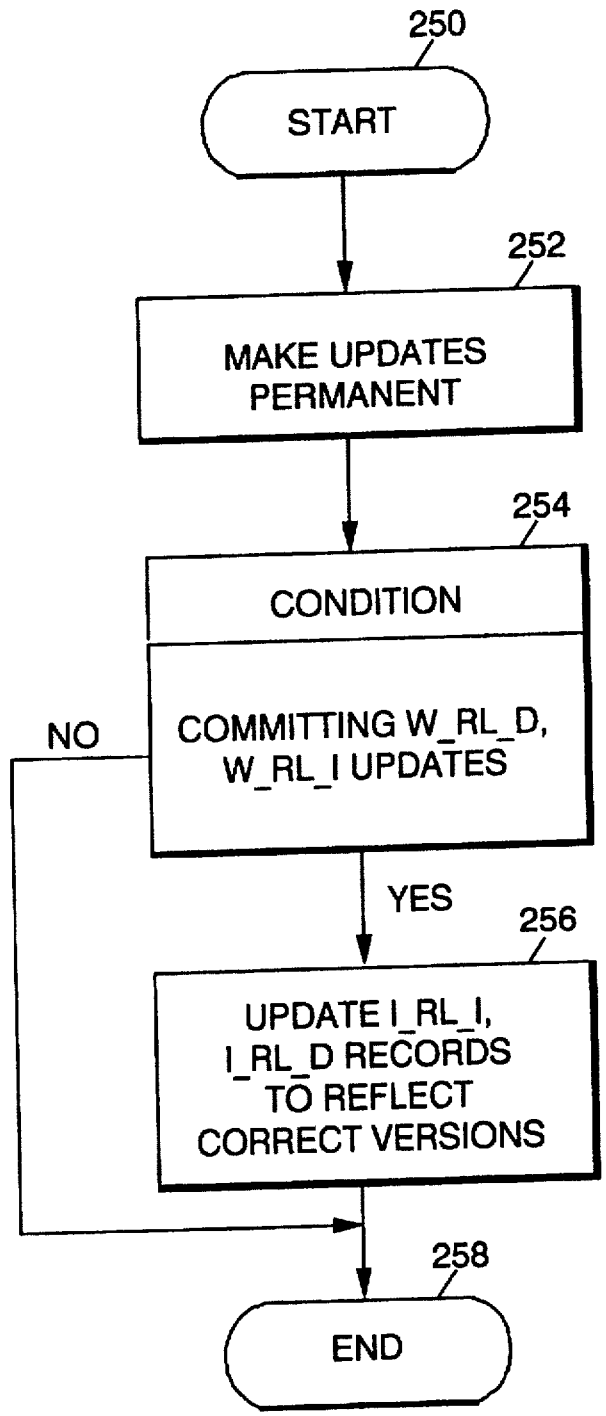

FIG. 4B shows the process and operation of committing an update. The process starts in step 250. Step 252 makes the updates permanent in storage. Operation 254 checks whether the updates being committed are write updates. If so, any affected inferencing records are updated in step 256 to reflect the current rule versions. Step 258 ends committing updates.

FIG. 5 shows the process and operation of requesting a rule lock. Operation 94 starts the process and operation 96 determines the type of lock request. Subroutine 98 (FIG. 6) is called for I_RL_I and I_RL_D locks. Subroutine 100 (FIG. 7) is called for R_RL_S and R_RL_U locks. Subroutine 102 (FIG. 8) is called for W_RL_I and W_RL_D locks. Operation 104 returns the request result and the version if the version was set. Operation 106 ends the process.

Figure 6B:
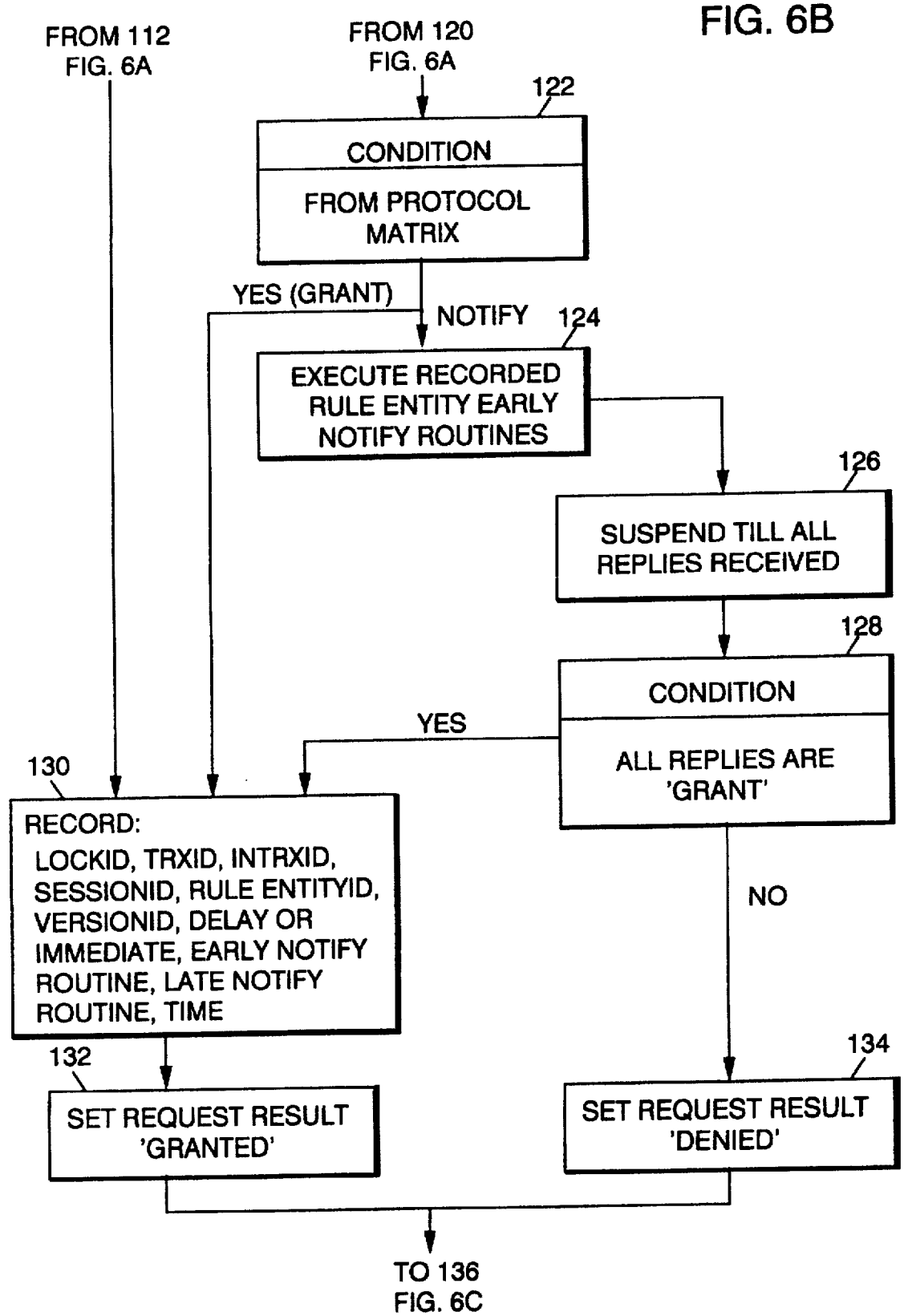
Figure 6C:
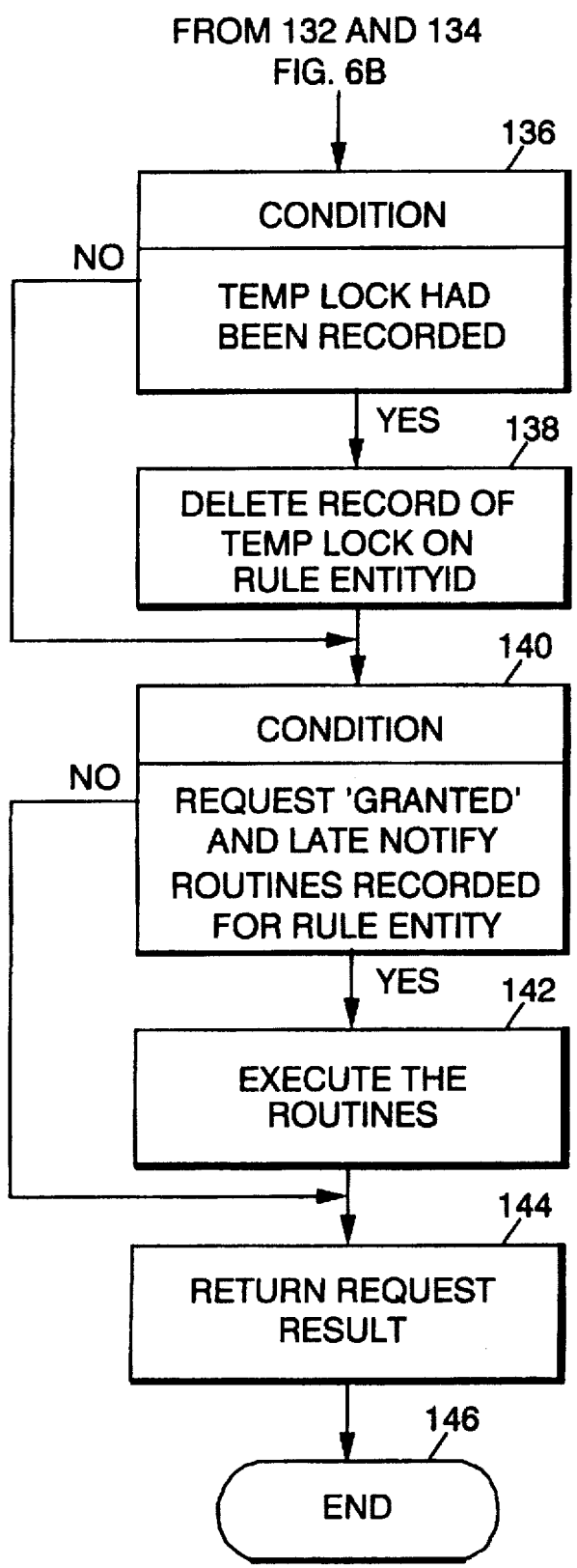
Figure 7B:
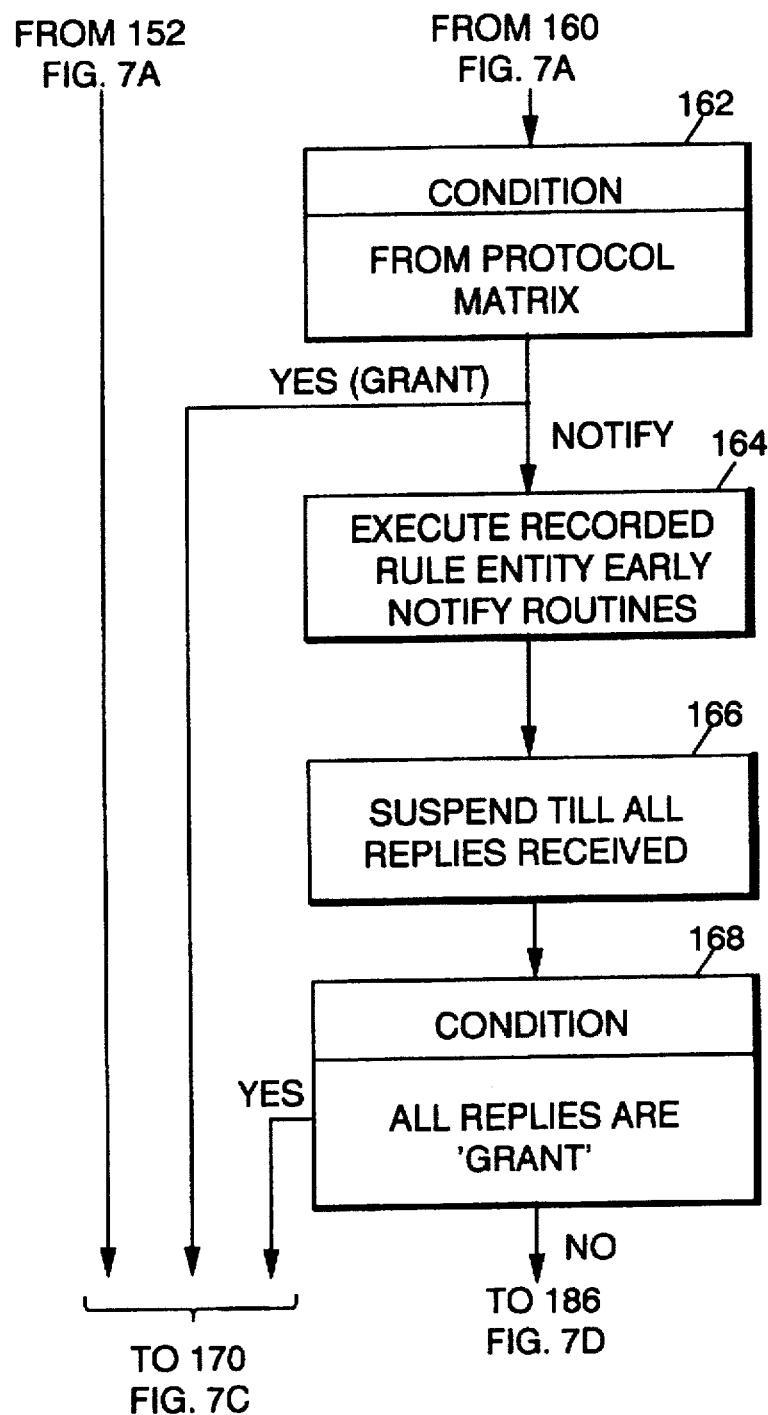
Figure 7C:
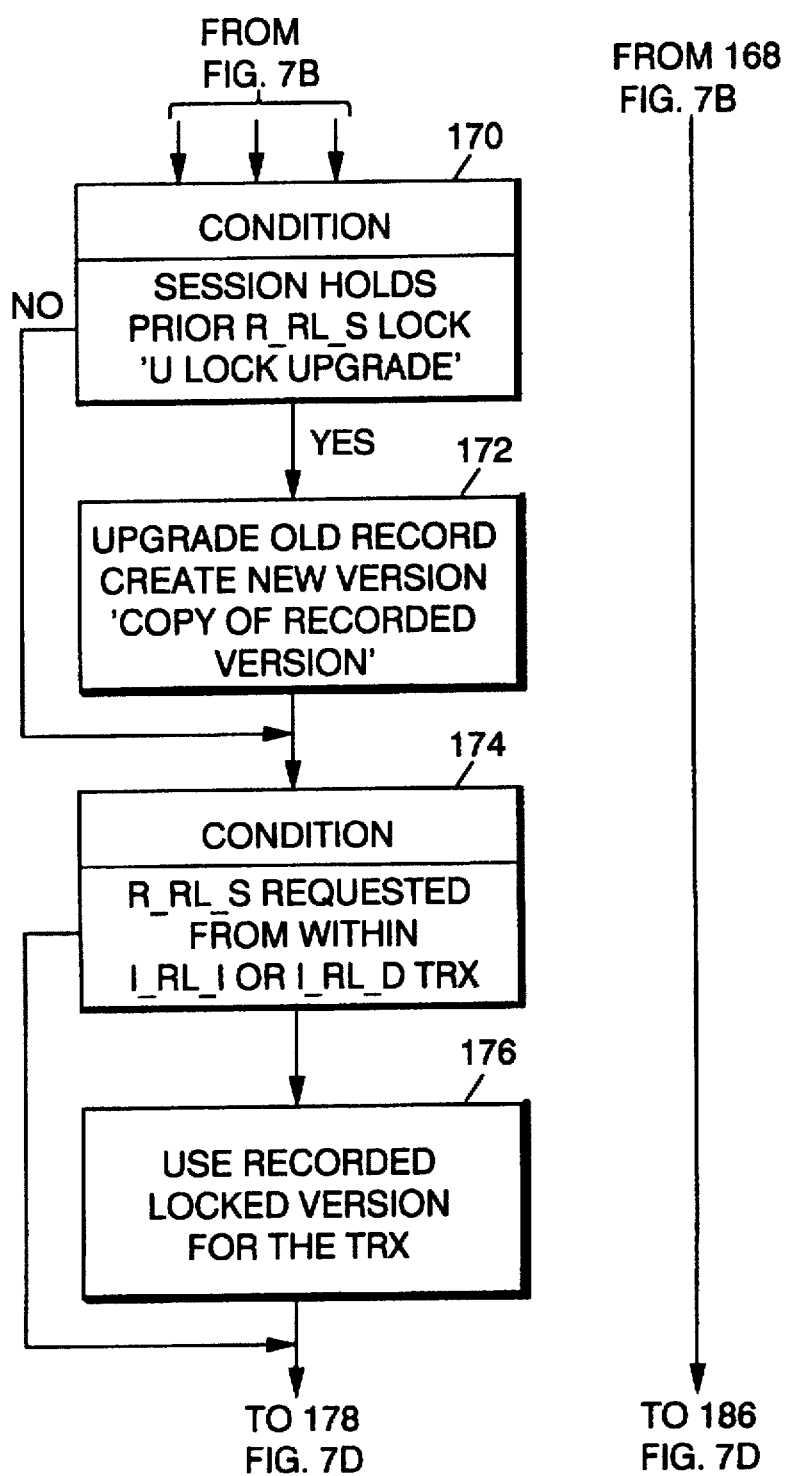
Figure 7D:
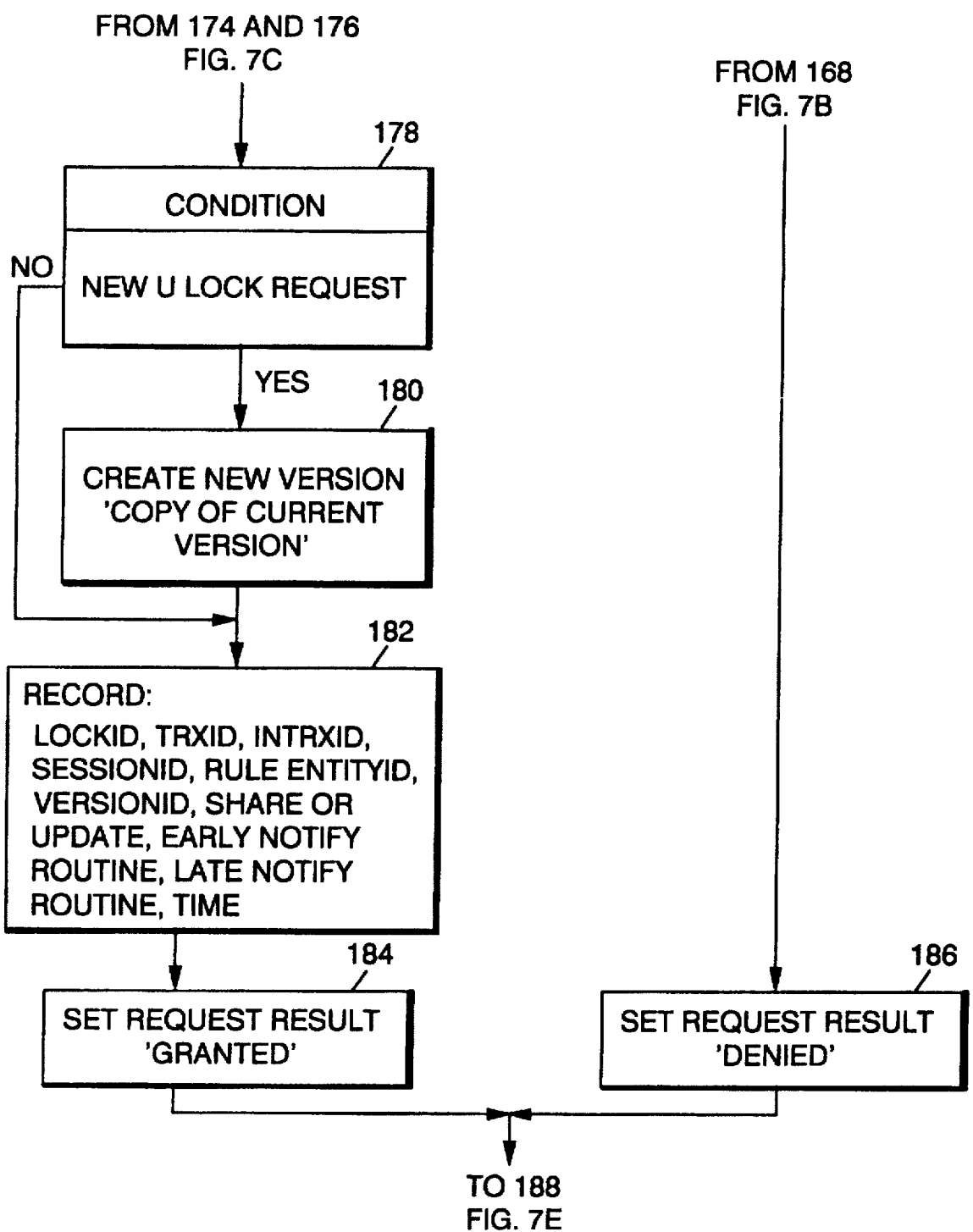
Figure 7E:
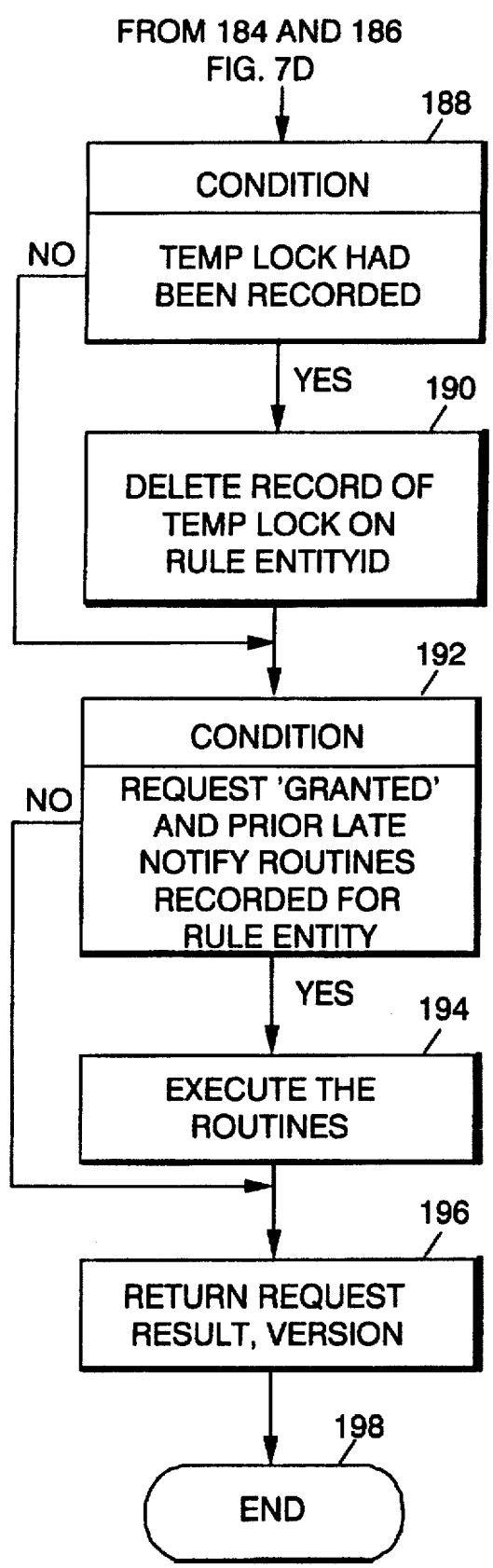

FIG. 6 shows the process and operation of requesting inference locks I_RL_I and I_RL_D. Operation 108 starts the process. Operation 112 checks whether the rule entity is locked and, if so, operation 114 tests to see whether the lock is temporary (temp). Temp locks are used by the system to delay processing of other lock requests for the same rule until the current lock request is resolved. If it is a temp lock, step 116 suspends the process until it is removed. Either way, the condition is recorded in step 118, and the protocol matrix is checked in step 120 to determine the appropriate action. If the lock was granted, or if the rule wasn't locked in operation 112, an identifying record is made in step 130 containing the lock data the system needs to keep track of the lock and the lock holder. This data would preferably include a unique transaction identifier (trxid), a session identifier, a lock identifier, an inference transaction identifier (intrxid), a rule entity identifier, a delay or immediate indicator, an identifier indicating whether early, late, or no notification is needed. Next, the request result is set to "granted" in step 132.

If the condition was "notify" in block 122, early notify routines are executed in step 124, and activity is suspended until all replies are received in step 126. If all replies are "grant" in the condition detected in step 128, a record is made in step 130. Otherwise, operation 134 sets the request result to "DENIED" and proceeds to step 136. Early notification means the lock holder wants the lock request refused until successful negotiation occurs (if negotiation is possible). Successful negotiation means that the conflict is removed. Either the original lock holding program gave up the lock or changed it to a nonconflicting lock with the lock requested by the requestor program, or the requestor program changed the lock requested to a lock which did not conflict with the lock held by lock holding program. The result of a successful negotiation is that all replies to the CCMDS are "grant". Late notification means the holder only wants to know that the lock was granted, but does not want to block the lock.

FIG. 9 shows the protocol matrix used in FIG. 6 by operation 120 and operation 122 which returns "yes" or "notify". If all replies from lock holders are "grant", the CCMDS at step 128 generates a success message (YES) indicating that the negotiation to resolve the conflict was successful as discussed above. Step 130 then creates an identifying record, and the request result is set to "grant" in step 132. If any of the replies were not "grant," the step 128 generates a failure message (NO) indicating that negotiations to resolve the conflicts failed, and the request result is set "denied" in operation 134.

Next, if step 136 determines that a temp lock was recorded in step 118, that record is deleted in operation 138. Operation 140 checks whether late notify routines have been recorded as a result of other locks having been granted for the same rule entity. If so, they are executed in step 142. The request result is returned in step 144 and operation 146 ends the process.

FIG. 7 shows the process and operation of requesting read locks R_RL_S and R_RL_U. Operation 150 starts the process and operation 152 checks whether the rule is already locked. If so, operation 154 determines whether a temp lock is in effect. If it is, step 156 suspends activity until the lock is removed. Either way, an identifying record indicating the status of the rule is made in step 158, and the protocol matrix is checked for action in step 160. If the lock is "granted", as detected in step 162 or if it wasn't locked in the first place in operation 152, operation 170 tests whether the session holds a prior R_RL_S lock and is now requesting an update lock, and step 172 creates a copy of the rule and upgrades the lock to R_RL_U, allowing the requester to modify the copy of the rule. The record is updated to reflect the new lock and multiple versions of the rule. When the new version of the rule is written, the old version will be deleted.

Next, operation 174 checks whether R_RL_S was requested from within I_RL_I or I_RL_D transaction, and step 176 uses the recorded locked version if an inferencing session made the request. If this is a new Update lock request, as detected by operation 178, operation 180 creates a new version of the rule so that it can be updated. Next, an identifying record is made in step 182. The request result is set to "granted" in step 184.

If, in operation 168, any replies from prior lock holders were not "grant", the request result is set to "denied". Whether the result is "granted" or "denied", some clean up is done. Operation 188 checks whether a temp lock was recorded in step 158, and step 190 deletes the record if so. If prior late notify routines were recorded for the rule as determined in step 192 they are executed in step 194. The request result and version are returned in step 196, and operation 198 ends the subroutine.

FIG. 8 shows the process and operation of requesting write locks W_RL_I and W_RL_D. Operation 202 begins the process and operation 204 tests whether the rule is locked. If it is, operation 206 checks whether a temporary (temp) lock is in effect, and step 208 suspends action until this temporary lock is removed. Either way, an identifying record is made in step 210 and the protocol matrix is checked in step 212 to determine the appropriate action.

If the condition detected in step 214 is "notify", early notify routines are executed in operation 216, and activity is suspended until all replies are received in step 218. If all replies are "grant", as detected in step 220 (conflict negotiation was successful), or the condition from the protocol matrix was "grant", as detected in step 214, or the rule wasn't locked in step 204, then operation 222 determines whether the current version has a I_RL_D lock on it. Step 224 retains a copy of the current version for that transaction if the current version has I_RL_D locks. An I_RL_D lock means that another session is using the old version, so a copy of it must be kept until the other session finishes. The old version will eventually be deleted by step 86 of FIG. 4A showing the operation of freeing locks. Whether an old version is retained in step 224 or not, the process creates a new version as current for writing to in step 226 and creates a lock record in step 228 which is deleted in step 236. A conversion record is created in step 229, which is retained until step 88 of FIG. 4A when the old rule is deleted and the conversion record is no longer necessary. The conversion record includes identifiers indicating the actions needed for presession, precycle, postcycle, and postsession conversions. The CCMDS initiates these steps at appropriate points in the inferencing session. The request result is set to "granted" in step 230.

If the condition determined in step 214 from the protocol matrix was "denied", or if all of the replies in step 220 were not "grant" (conflict negotiation failed), the request result is set to "denied" in step 232. Whether the request was granted or denied, operation 234 now checks whether a temp lock was recorded, and step 236 deletes the record if so. Operation 238 checks whether late notify routines were recorded as a result of earlier lock requests. If so, step 240 executes them. The request result is returned in step 242, and the process ends in step 244.

FIGS. 9A and 9B show the locking protocol matrices in detail. A table is shown in FIG. 10 to assist in reading each locking protocol matrix. In FIG. 9A, the column along the left indicates the lock that is already held, while the row along the top indicates the lock requested. The top portion of the matrix is used when the session holding the lock is using either an old or a current version of the production rule, while the bottom portion is used when the lock is using the current version of the rule. Some lock types can only apply to the current version. For example, a session wouldn't hold an I_RL_I lock on an old version of a rule. The action indicated in the block where a row and column meet indicates the CCMDS response to that situation. For example, when an I_RL_D or _I lock is held on a rule, any other lock may be granted, with the exception of R_RL_U, W_RL_I and W_RL_D requests, in which case, the inferencing session and the session(s) holding the lock(s) will be notified. Late notify routines just inform the holder of locks that are granted. Early notify routines permit negotiation between the holder and the requester. Conversion routines allow adjustments to be made to existing execution sessions to allow immediate use of new rules, or continued use of old ones. Default routines pick a safe response if notify is indicated but the users have not specified a response. The holding session(s) can consent to lock requests by changing the type of locks they hold or removing locks. For example, in the case where an I_RL_D is held and a W_RL_I lock is requested, either the inferencing session must change its lock to permit immediate updating (to I_RL_I), or the updating session must change the lock it is requesting to update after the inferencing session is complete (to W_RL_D).

A held R_RL_S lock requires notification and negotiation in the same cases as an I_RL_D lock, but is held only while the rule is active, rather than for the entire inferencing session. A held R_RL_U also requires notification and negotiation when a R_RL_S lock is requested.

FIG. 9B is similar to FIG. 9A, but also includes the common serial access protocol for non-rule, non-control data. It illustrates that there is no potential for conflicts between locks on control and non-control data, and also allows comparison between the present invention and the more traditional protocol. Requests for locks for reading and writing data have the potential to be contradictory and non-negotiable because only one person may change a given block of data at a time. If a user holds a R_DT_S lock, for example, no one can get a W_DT lock. If a R_DT_U lock is held, neither another R_DT_U nor a W_DT lock may be granted. Also, a W_DT lock blocks R_DT_S, R_DT_U and W_DT locks.

Similarly, in FIGS. 9A and 9B, held locks for writing rule modifications can conflict. Thus, if a W_RL_D or _I lock has been granted, a request for another W_RL_D or _I lock must be refused.

FIG. 10 illustrates the full lock type names, and the abbreviations that are used in the figures and detailed description.

Figure 11B:
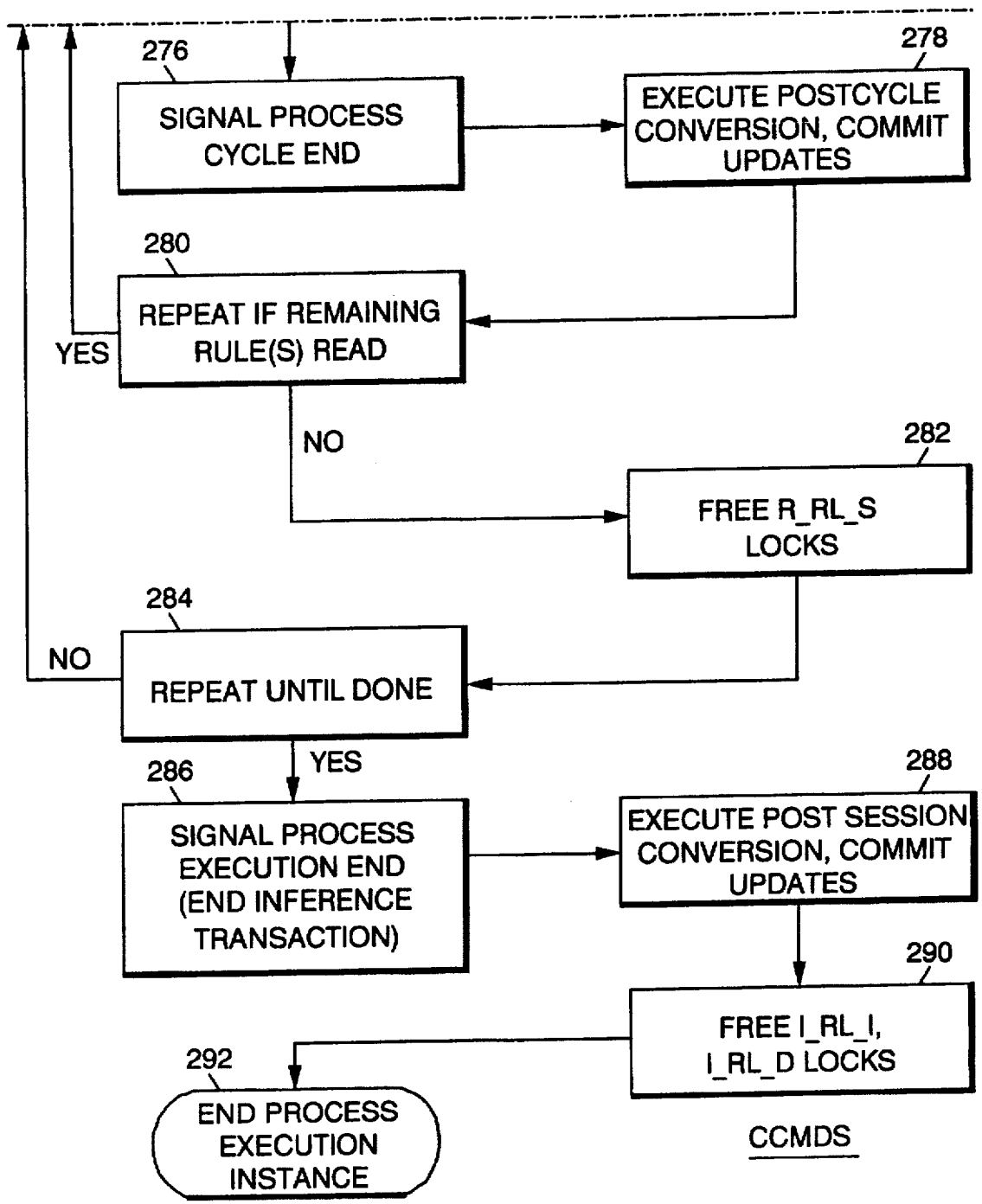

FIG. 11 shows another preferred embodiment of the invention. The present invention is useful for managing concurrent access to control data by ordered rule processors, such as workflow managers. FIG. 11 shows the communication between the Concurrency Control Manager and Data Store (CCMDS) and the ordered rule processor in an execution session. All of the previous figures and description apply equally to this embodiment of the invention if it is kept in mind that I_RL_I and I_RL_D are executing locks requested by any executing program including an inferencing program or an ordered rule processor.

Process step 260 begins the process execution instance. The ordered rule processor signals the inference transaction in step 262, and the CCMDS requests I_RL_I or I_RL_D locks for all procedural rules to be used by the session in step 264. Conflicts are handled according to the protocol matrix shown in FIGS. 9A and 9B, and described in the text above. Recorded precycle conversion is performed in step 264 if the conversion conditions specified are met. In other words, the user that updates a rule for which a lock is sought can specify that certain conversion activities occur before the rule is used. These activities might include defining or reformatting data to be used by the rule. The updater defines the conversion to be performed and the conditions for performing the conversion as part of the request to update the rule. (See FIG. 8, step 229.) The sequential nature of ordered rule processing permits conditions on conversion to be specified. For example, an updater could specify that conversion should be performed only if a specific point in a series of rules has been reached, or if a particular combination of rules has been executed.

The Ordered Rule Processor (ORP) then reads a rule (or set of rules) to be executed in step 268. The CCMDS requests read rule shared locks on these rules. The locks are obtained and conflicts are handled, as in the first embodiment. In operation 272, the ORP evaluates the premise of the next rule in order, and in operation 274 the ORP executes the rule's specified actions if the premise is true. The ORP signals the process cycle end in step 276. The CCMDS executes postcycle conversion, if specified conversion conditions have been met, and commits updates, as described hereinabove, in step 278. The process then returns to the ordered rule processor at step 280. In step 280, the ORP loops to step 272 if any rules read in step 268 remain to be processed. If no rules remain, then the CCMDS releases the R_RL_S locks since the ORP is finished with those rules. ORP step 284 checks whether the execution session is done. If not, the ORP loops to step 268. If so, the ORP signals that execution is complete in step 286. The CCMDS executes postsession conversion if conditions are met, and commits updates in step 288. The CCMDS frees the I_RL locks in step 290. ORP step 292 ends the process execution instance (and the associated inference transaction). Except as specified above, requesting locks, handling conflicts, performing conversion, committing updates, etc., are performed exactly the same as in the first embodiment.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a computing system supporting concurrent access to control data by a plurality of program sessions where each of the program sessions requests a lock on the control data for concurrent access by each program session, a method for controlling concurrent access to the control data comprising the machine executed steps of:

receiving a request from a program session for a lock on the control data being accessed by the program session, wherein the control data is a set of rules for execution by the program session;

granting the holding of a lock on the control data;

receiving requests from other program sessions for additional locks on the control data, wherein at least one of the held lock and the requests for additional locks is an inferencing lock, wherein the inferencing lock allows a requesting program session to execute the control data;

determining whether each of the requests for an additional lock conflicts with any held lock on the control data, or whether each of the requests does not conflict with any held lock, or whether negotiation between the holder of the held lock and the requester of the additional lock is required;

granting an additional lock for each request that does not conflict with any held lock, wherein a reading update lock does not conflict with an inferencing lock, wherein the reading update lock indicates that the control data being locked will be modified;

for each request for an additional lock that conflicts with any held lock, determining whether the request and the conflicting held lock can be resolved by negotiation between the holder of the held lock and the requester of the additional lock;

denying those requests for additional locks where the request conflicts with any held lock and at least one of the held locks or requests cannot be resolved by negotiation between the holder of the held lock and the requester of the additional lock;

notifying program sessions holding locks and program sessions requesting locks if the requests and held locks are negotiable;

generating a success message indicating the negotiation has been successful or a failure message indicating the negotiation has failed, wherein said generating step further comprises the steps of:

detecting that a program session holding a lock has removed the held lock or has changed the held lock to a lock that does not conflict with each requested additional lock or that the requesting program sessions have changed the requested additional locks to locks that do not conflict with the held lock, sending a success message in response to any of the conditions detected by said detecting step, and sending a failure message if none of the conditions detected by said detecting step are detected;

granting the additional locks to sessions in response to the success message; and denying the additional locks if there is a failure message.

2. The method of claim 1 and in addition the step of:

creating a plurality of versions of the control data, if the requests for additional locks are granted, so that each program session can have access to the control data.

3. The method of claim 2 wherein said creating step comprises the steps of:

retaining a copy of the data for access by the each program session holding a lock;

creating a version of the data for each program session granted an additional lock; and deleting the retained copy when the first program has completed access to the retained copy.

4. In a computing system supporting concurrent access to control data by a first program and a second program where each of the first and second programs requests a lock on the control data being accessed by each program, a method for controlling concurrent access to the control data comprising the machine executed steps of:

receiving a request for a first lock on the control data being accessed by the first program, wherein the control data is a set of rules for execution by the first program;

placing the first lock on access to the control data being accessed by the first program;

receiving a request from the second program for a second lock on the control data locked by the first lock placed by the first program, wherein one of the first lock and the second lock is an inferencing lock, wherein the inference lock allows a requesting program to execute the control data;

determining whether or not the request for the second lock conflicts with the first lock placed on the control data;

granting the second lock if the request for the second lock does not conflict with the first lock, wherein a reading update lock does not conflict with an inferencing lock, and wherein a reading update lock indicates that the control data being locked will be modified;

if the request for the second lock conflicts with the first lock, determining whether the first lock and the request for the second lock can be resolved by negotiation between the first program and the second program;

denying the second lock if the request for the second lock conflicts with the first lock and the first lock and the request for the second lock cannot be resolved by negotiation between the first program and the second program;

notifying the first program and the second program if the request for the second lock is negotiable;

generating a success message indicating the first and second program have successfully negotiated the locks or a failure message indicating the first and second program did not resolve the conflict, wherein said generating step comprises the steps of:

detecting that the first program has removed the first lock or has changed the first lock to a lock that does not conflict with the requested second lock or that the second program has changed the requested second lock to a lock that does not conflict with the first lock, sending a success message in response to any of the conditions being detected by said detecting step, and sending a failure message if said detecting step does not a removal or change of lock granting the second lock in response to the success message; and denying the second lock if there is a failure message.

5. The method of claim 4 and in addition the step of:

creating two versions of the control data, if the request for the second lock is granted, so that the first program and the second program can both have access to the control data.

6. The method of claim 5 wherein said creating step comprises the steps of:

retaining a copy of the control data for access by the first program;

creating a new version of the control data as a current version for access by the second program;

deleting the retained copy when the first program has completed access to the retained copy.

7. The method of claim 4 wherein the first program has working data separate from the control data, and the second program has updated the control data, and in addition the steps of:

performing conversion actions on the working data, wherein the conversion actions are specified by a user who requested modification of the control data.

8. The method of claim 7 wherein the first program is an inferencing program, and said performing step is performed prior to an inferencing cycle of the inferencing program.

9. The method of claim 7 wherein the first program is an inferencing program, and said performing step is performed after an inferencing cycle of the inferencing program.

10. The method of claim 4 wherein locks are inferencing, reading or writing locks, and the locks have a priority that is immediate or delayed for the inferencing and writing locks, and shared or update for the reading lock, and wherein said conflict determining step determines that the request from the second program conflicts if:

the first lock is an inferencing lock and the request is an inferencing lock;

the first lock is an inferencing lock and the request is for a reading shared lock;

the first lock is a reading shared lock and the request is for an inferencing lock;

the lock is a reading update lock and the request is for an inferencing lock;

the lock is a writing immediate lock and the request is for an inferencing immediate lock; and the lock is a writing delayed lock and the request is for an inferencing delayed lock.

11. The method of claim 10 wherein said conflict determining step determines that the request from the second program is negotiable if:

the first lock is an inferencing lock and the request is for a reading update lock or a writing lock;

the first lock is a writing immediate lock and the request is for an inferencing delayed lock; and the first lock is for a writing delayed lock and the request is for an inferencing immediate lock.

12. Apparatus for use in a computing system supporting concurrent access to control data by a first program and a second program where each of the first and second programs requests a lock on the control data being accessed by each program comprising:

first means for receiving a request for a first lock on the control data being accessed by the first program, wherein the control data is a set of rules for execution by the first program;

means responsive to the request for a first lock for placing the first lock on access to the control data being accessed by the first program;

second means for receiving a request from the second program for a second lock on the control data locked by the first lock placed by the first program, wherein one of the first lock and the second lock is an inferencing lock, wherein the inferencing lock allows a requesting program to execute the control data;

first determining means for determining if the request for the second lock conflicts with the first lock placed on access to the control data;

means, responsive to said first determining means, for granting the second lock if the request for the second lock does not conflict, wherein a reading update lock does not conflict with an inferencing lock, and wherein a reading update lock indicates that the control data being locked will be modified;

second determining means, responsive to said first determining means, for determining whether the first lock and the request for the second lock can be resolved by negotiation between the first program and the second program if the request for the second lock conflicts with the first lock;

means, responsive to said second determining means, for denying the second lock if the request for the second lock conflicts with the first lock and the locks cannot be resolved by negotiation between the first program and the second program;

means responsive to said second determining means for notifying the first program and the second program of a negotiable conflict between the first lock and the request for the second lock;

means for executing negotiation of the negotiable conflict and sending a success message if the negotiation resolves the conflict and a failure message if the negotiation does not resolve the conflict, wherein said negotiating executing means further comprises:

first means for detecting the first program has removed the first lock or has changed the first lock to a type that does not conflict with the requested second lock, second means for detecting the second program has changed the requested second lock to a type that does not conflict with the first lock, and means responsive to said first and second detecting means for sending a success message if the first lock is removed or the first lock or requested second lock are changed to be non-conflicting;

means in response to the success message for granting the second lock; and means in response to the failure message for denying the second lock.

13. The apparatus of claim 12 and in addition:

means for providing two versions of the data, if the request for the second lock is granted, so that the first program and the second program can both have access to the control data.

14. The apparatus of claim 13 wherein said providing means comprises:

means for retaining a copy of the data for access by the first program;

means for creating a new version of the data as a current version for access by the second program; and deleting the retained copy when the first program has completed access to the retained copy.

* * * * *